(12) United States Patent
Hara et al.

(10) Patent No.: US 8,601,681 B2
(45) Date of Patent: Dec. 10, 2013

(54) METHOD FOR PRODUCING AN OPTICAL ELEMENT

(75) Inventors: Akiko Hara, Hino (JP); Setsuo Tokuhiro, Tokorozawa (JP)

(73) Assignee: Konica Minolta Opto, Inc., Tokyo (JP)

( * ) Notice: Subject to any disclaimer, the term of this patent is extended or adjusted under 35 U.S.C. 154(b) by 37 days.

(21) Appl. No.: 13/002,826

(22) PCT Filed: Jun. 25, 2009

(86) PCT No.: PCT/JP2009/061595
§ 371 (c)(1),
(2), (4) Date: Jan. 6, 2011

(87) PCT Pub. No.: WO2010/004879
PCT Pub. Date: Jan. 14, 2010

(65) Prior Publication Data
US 2011/0111256 A1    May 12, 2011

(30) Foreign Application Priority Data

Jul. 11, 2008    (JP) .................................. 2008-181764

(51) Int. Cl.
*H05K 3/36* (2006.01)
(52) U.S. Cl.
USPC .................................. 29/830; 29/832; 428/30
(58) Field of Classification Search
USPC ....................... 29/330, 832, 840, 830; 428/30
See application file for complete search history.

(56) References Cited

U.S. PATENT DOCUMENTS

| | | | | |
|---|---|---|---|---|
| 5,175,030 | A * | 12/1992 | Lu et al. | 428/30 |
| 6,107,364 | A * | 8/2000 | Fong et al. | 522/182 |
| 6,416,690 | B1 * | 7/2002 | Soane et al. | 264/1.7 |
| 2004/0202879 | A1 * | 10/2004 | Xia et al. | 428/500 |

FOREIGN PATENT DOCUMENTS

| | | | |
|---|---|---|---|
| JP | 06-198761 | * | 7/1994 |
| JP | 2001-201602 | | 7/2001 |
| JP | 2002-224516 | | 8/2002 |
| JP | 2004-153855 | | 5/2004 |
| JP | 2004-271653 | | 9/2004 |
| JP | 2005-031304 | | 2/2005 |
| JP | 2008-160348 | | 7/2008 |
| JP | 2008-160648 | | 7/2008 |

* cited by examiner

*Primary Examiner* — Carl Arbes
(74) *Attorney, Agent, or Firm* — Cozen O'Connor

(57) ABSTRACT

Disclosed is an optical element to be subjected to a reflow process at high temperatures, wherein cracks or wrinkles can be prevented from occurring in an antireflection film. A method for producing the optical element, and a method for manufacturing an electronic device using the optical element are also disclosed. Specifically disclosed is a method for producing an optical element comprising a base, wherein at least one optical surface is composed of a resin material, and a coating formed on the optical surface of the base and composed of an inorganic material, the optical element being mounted on a substrate together with an electronic component by a reflow process at a temperature Ta. The method is characterized in that the coating is formed at a film-forming temperature Tb of not less than (Ta−60° C.), and a material having a glass transition temperature of not less than 290° C. or a glass transition temperature of not less than (Tb−50° C.) is used as the resin material.

4 Claims, 15 Drawing Sheets

FIG. 8a
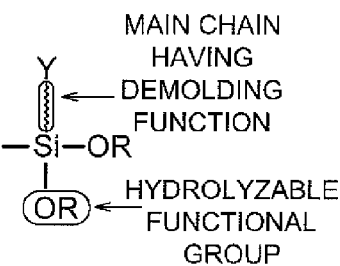
FIG. 8b
FIG. 8c
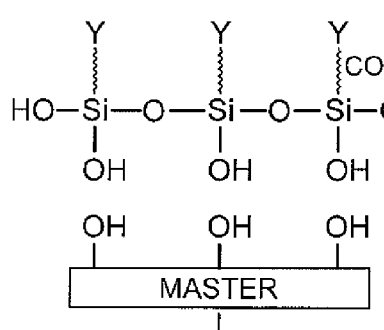
FIG. 8d
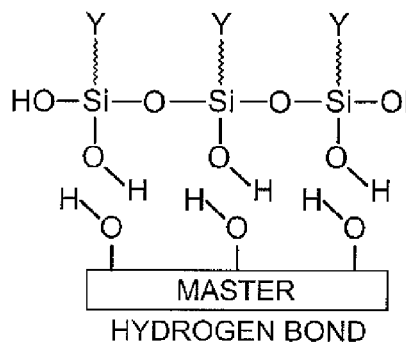
HYDROGEN BOND
FIG. 8e
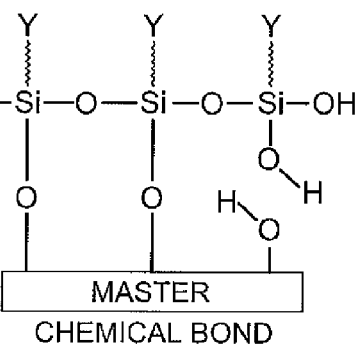
CHEMICAL BOND
FIG. 9
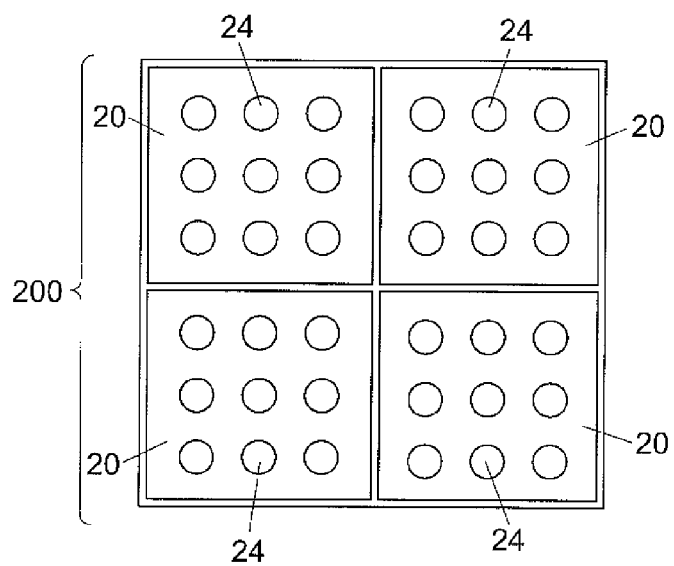

METHOD FOR PRODUCING AN OPTICAL ELEMENT

RELATED APPLICATIONS

This application is a U.S. National Phase Application under 35 USC 371 of International Application PCT/JP2009/061595 filed Jun. 25, 2009.

This application claims the priority of Japanese application 2008-181764 filed Jul. 11, 2008, the entire content of which is hereby incorporated by reference.

TECHNICAL FIELD

The present invention relates to an optical element which can prevent generation of cracks or wrinkles in an anti-reflection layer, a method for producing the same, and a method for manufacturing an electronic device using the same.

BACKGROUND TECHNOLOGY

Heretofore, in a technology field of an electronic module in which an IC (Integrated Circuits) chip and other electronic component are mounted on a circuit board, there has been developed a technology by which an electronic module is manufactured at a low cost using a technology such that a metal paste (for example, a solder paste) is in advance applied (potting) to prescribed positions on a circuit board, and then the aforesaid circuit board is subjected to a reflow process (a heating process) with an electronic component being placed at the places to mount the electronic component in the aforesaid circuit board (for example, refer to Patent Document 1). In recent years, there has been studied a technology in which above technologies are employed to electronic devices such as a cell phone equipped with an imaging device.

In the meantime, as a material of the optical element used for the imaging device, a resin material is preferably used in view of easy molding. In general, as the optical element for the imaging device, thermoplastic resin, with which an injection molding is possible, is widely used. However, there was a problem such that, in the case where a reflow process, in which the imaging device or the electronic component is mounted on a circuit board in an integrated manner, is carried out, the optical element made of resin becomes soft, and thereby the optical element can not be used.

As a technology using the reflow process, there is proposed a technology by which an electronic device having an imaging device is manufactured in such a manner that an imaging device, containing an electronic member on which a socket (a lens case) is arranged, and other electronic members are placed on a circuit board and are mounted on the circuit board by the reflow process, after which an imaging lens is inserted into the socket (for example, refer to Patent Document 2). However, in such a technology, it is necessary to carry out positioning of the imaging optical system in a state that an electronic component of the imaging device is mounted on a circuit board. Therefore, it is difficult to perform correct positioning, and at the same time, a shape of the optical system is limited or the lens is limited to a simple structure of a fixed focus type, and then, other solutions have been demanded.

Therefore, the present inventors has been studying to use, in the case of manufacturing the imaging device which will be subjected to the reflow process, a high heat-resisting material, so that the imaging lens has a reflow resistant property, as a resin material for the aforesaid imaging lens, for example curable resin such as heat curable resin and light curable resin, which, once cured, forms a net-like structure which does not exhibit fluidity even at a high temperature. In the case of using the curable resin, compared to thermoplastic resin, it exhibits a high heat-resisting property, whereby it becomes possible to suppress degradation of optical performance due to softening or breaking down by the reflow process.

In general, in the imaging lens, an anti-reflection layer comprising an inorganic material is arranged on a base material in view of reducing the loss of the amount of light. Heretofore, in the case where an anti-reflection layer is arranged on base material composed of thermoplastic resin, the anti-reflection layer has been vapor deposited on the base material at 100° C. or lower to avoid softening of the thermoplastic resin.

PRIOR ARTS

Patent Documents

Patent Document 1: JP-A No. 2001-24320
Patent Document 2: JP-A No. 2004-153855

SUMMARY OF THE INVENTION

Issues to be Solved by the Invention

However, in the case where an imaging lens, in which the anti-reflection layer was formed under the similar conditions on the base material comprising curable resin, was subjected to the reflow process, it was found that a new problem occurred, even though no problem such as softening or coloring of the base material occurred. It is a problem that, in the case where an imaging lens, in which the anti-reflection layer comprising an inorganic material was formed on the base material comprising curable resin, was subjected to the reflow process, since a coefficient of linear expansion of the anti-reflection layer is small, while that of the base material resin is large, only the base material expands, resulting in generation of a crack in the anti-reflection layer.

To solve the above problem, in anticipation of expansion of the base material during the reflow process, it was also studied to vapor deposit the anti-reflection layer on the base material which was in advance made expanded at high temperature. As a result, though the generation of a crack in the anti-reflection layer was suppressed, in the case where the imaging lens was cooled down to a room temperature after formation of the anti-reflection layer, minute wrinkles were sometimes generated on the lens surface as shown in FIGS. 17 and 18 to result in the decrease in the transmittance, or the generation of the aberration.

The issue of the present invention is, in an optical element being subjected to a reflow process at a high temperature, to provide an optical element which can prevent generation of a crack or wrinkles in an anti-reflection layer, a method for producing the same, and a method for manufacturing an electronic device.

Measures to Solve the Issues

The above issue relating to the present invention is dissolved by the methods described below.

1. A method for producing an optical element comprising a base material in which at least one optical surface is formed of a resin material, and a coat comprising an inorganic material formed on the optical surface of the base material, and which is mounted on a board together with an electronic component by a reflow process at temperature Ta, wherein the coat is formed at film-forming temperature Tb of not less than (Ta−60° C.), and the resin material is a material having a glass transition temperature of not less than 290° C. or having a glass transition temperature of not less than (Tb−50° C.).

2. The method for producing the optical element of item 1, wherein the resin material is a material containing a curable resin.

3. The method for producing the optical element of item 1 or 2, wherein the base material is a wafer lens comprising a first optical member composed of a material containing glass or the curable resin, and a second optical member composed of the resin material and joined to the first optical member.

4. A method for manufacturing an electronic device by mounting an imaging lens and the electronic component on the board as an imaging module, comprising steps of:

placing an optical element as the imaging lens produced by the method for producing the optical element of any one of items 1 to 3 on aboard together with an electronic component, and then processing the imaging lens, the electronic component, and the board by the reflow process at temperature Ta.

5. An optical element produced by the method for producing the optical element of any one of items 1 to 3.

Effects of the Invention

By the study of the present inventors, it was found that, in the case where an optical element, in which a coat composed of an inorganic material is formed on a base material comprising a resin material, is subjected to a reflow process, since a coefficient of linear expansion of the coat is small, while that of the base material resin is large, only the base material expands, and as a result a crack may be generated in the coat. However, it was found that it becomes possible to prevent such generation of the crack, if the coat is formed at film-forming temperature Tb of higher than or equal to (temperature of reflow process Ta−60° C.).

In addition, by the study of the present inventors, it was discovered that it becomes possible to remarkably suppress generation of wrinkles in the coat by allowing the resin material of the optical surface of the base material having a glass transition temperature of not less than 290° C. or having a glass transition temperature of higher than or equal to (coat forming temperature Tb−50° C.), and by forming a coat composed of an inorganic material at film-forming temperature Tb on the above optical surface of the base material.

Further, by using a resin material containing curable resin, it becomes possible to provide a heat-resisting property which can resist the reflow process.

At this point, by the study of the present inventors, it was found that even the curable resin becomes slightly softened when it is used at a temperature significantly exceeding the glass transition temperature. Due to the reason, it was confirmed that, when the coat was made at a high temperature, the softened surface portion shrinks when being cooled down to a room temperature, and at the same time, the difference in shrinkage percentage from the inorganic material causes wrinkles. Therefore, it was also discovered that, even if resin material containing curable resin is used, it becomes possible to remarkably suppress generation of wrinkles in the coat by allowing the resin material to be the above-described one (namely, having a glass transition temperature of not less than 290° C., or having a glass transition temperature of higher than or equal to (coat forming temperature Tb−50° C.), and by forming a coat composed of an inorganic material at film-forming temperature Tb on the above optical surface of the base material.

Therefore, by using such an optical element as the imaging lens, an electronic module can be manufactured using a reflow process at a lower cost.

BRIEF DESCRIPTION OF THE DRAWINGS

FIG. 8 is a figure showing a reaction of mold release agents, in which alkoxy silane groups are used at its end as an example of a hydrolytic functional group, with OH groups on the surface of a master.

FIG. 9 is a plan showing a schematic constitution of a large-size sub-master.

MODE FOR CARRYING OUT THE INVENTION

The method for producing an optical element of the present invention is a method for producing an optical element, which is provided with a base material in which at least one optical surface is formed of resin material, and with a coat comprising inorganic material and formed on the above optical surface of the above base material, and is mounted on a board together with an electronic component by a reflow process at a temperature Ta, wherein the above coat is formed at film-forming temperature Tb of higher than or equal to (Ta−60° C.), and as the above resin material, there is used a material having a glass transition temperature of not less than 290° C. or having a glass transition temperature of higher than or equal to (Tb−50° C.).

As an embodiment of the present invention, in view of the appearance of the effect of the present invention, a resin material containing curable resin as the above resin material is preferably used. In addition, as the above base material, preferably used a wafer lens comprising a first optical member composed of a material containing glass or curable resin, and a second optical member composed of the above resin material and is joined to the surface of the above first optical member.

An optical element as an imaging lens manufactured by the method for producing the optical element of the present invention may be preferably used in a method for manufacturing an electronic device, wherein the above optical element is placed on a board together with an electronic component, after which the above imaging lens, the above electronic component, and the above board are subjected to the reflow process at temperature Ta, and then resulting in that the above imaging lens and the above electronic component are mounted on the above board as an imaging module.

Hereinafter, preferred embodiments of the present invention will be described in detail with reference to figures.

The First Embodiment

Figure 1:
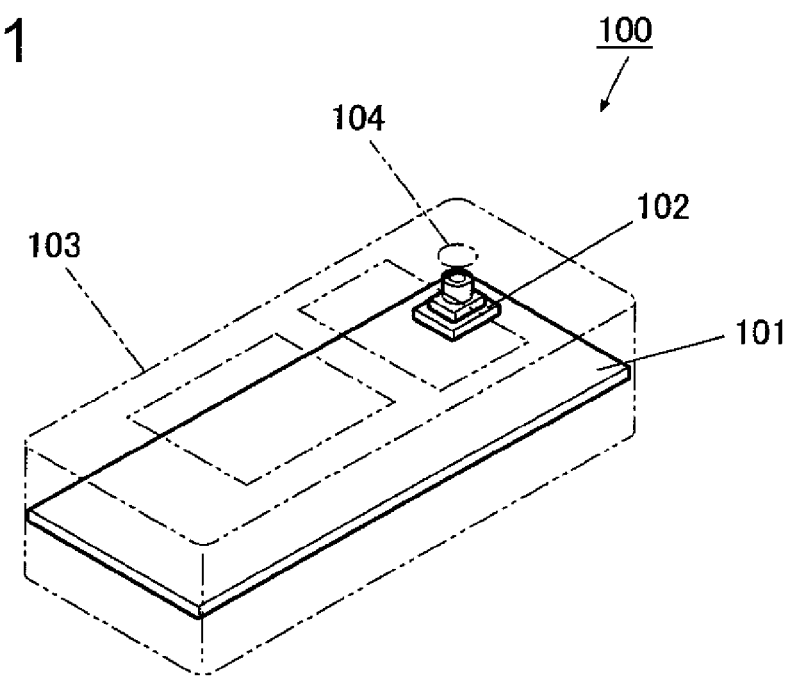
FIG. 1 is a schematic perspective view of an electronic device used in a preferred embodiment of the present invention.

As shown in FIG. 1, electronic device 100 is an example of a small electronic device such as a cellular phone with an imaging function, and is equipped with circuit board 101 on which an electronic component is mounted. On the circuit board 101, imaging module 102 is mounted by a reflow process. Imaging module 102 is a small camera for mounting on a board in which a CCD image sensor and a lens are combined. In a completed state in which circuit board 101, in which the electronic component was mounted, was installed in cover case 103, it is designed so that images of imaging subjects can be taken through imaging opening 104 arranged at cover case 103.

In FIG. 1, illustrations of electronic components, except for electronic components of imaging module 102, are omitted.

Figure 2:
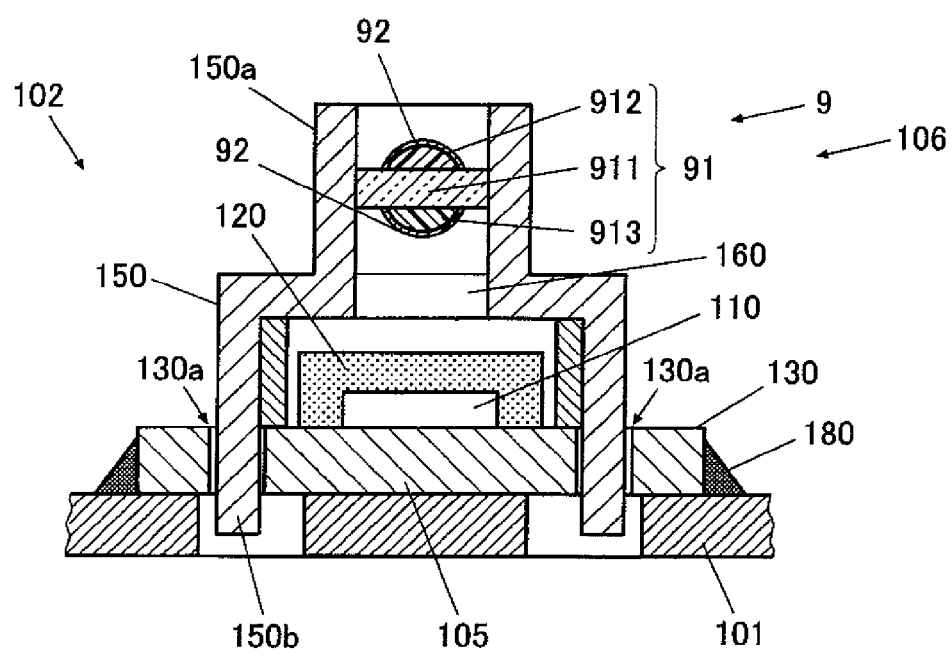
FIG. 2 is a schematic cross section of a magnified periphery of an electronic device used in a preferred embodiment of the present invention.

As shown in FIG. 2, imaging module 102 is composed of board module 105 (refer to FIG. 14a) and lens module 106 (refer to FIG. 14a), and, by mounting board module 105 on circuit board 101, the whole imaging module 102 is mounted on circuit board 101. Board module 105 is a light receiving module in which CCD image sensor 110, which detects light collected by lens module 106, is mounted on sub-board 130. The upper surface of CCD image sensor 110 is sealed by resin 120. The CCD sensor is an example of a sensor device.

On the upper surface of CCD image sensor, formed is a light receiving part (illustration is omitted) in which a plurality of pixels, by which photoelectric conversion is carried out, are arranged in a lattice pattern, and, by focusing an optical image on the light receiving part, charges charged in each pixel are output as an image signal. Sub board 130 is mounted on circuit board 101 by electrically-conductive material 180 such as solder, by which sub board 130 is fixed to circuit board 101, and at the same time, a connection electrode (illustration is omitted) of sub board 130 and a circuit electrode (illustration is omitted) on the upper surface of circuit board 101 become electrically conductive to each other.

Lens module 106 is provided with lens case 150. In lens case 150, IR cut filter 160 and imaging lens 9 are held. The upper part of lens case 150 is holder part 150a holding IR cut filter 160 and imaging lens 9.

The lower part of lens case 150 is fitting part 150b which fixes lens module 106 to sub board 130 by inserting lens module 106 into fitting hole 130a, which is arranged at sub board 130. For this fixing, used is a method such as a fixing method by pressing fitting part 150b into fitting hole 130a, and an adhesion method using an adhesive material.

In the above electronic device 100, when light enters through imaging opening 104 (refer to FIG. 1), the light passes through imaging lens 9, and then infrared rays are screened by IR cut filter 160. After that, the resulting light enters into CCD image sensor 110, where the light is subjected to a photoelectric conversion by CCD image sensor 110, resulting in a formation of an image or the like.

Subsequently, imaging lens 9 will be described in detail.

Figure 3:
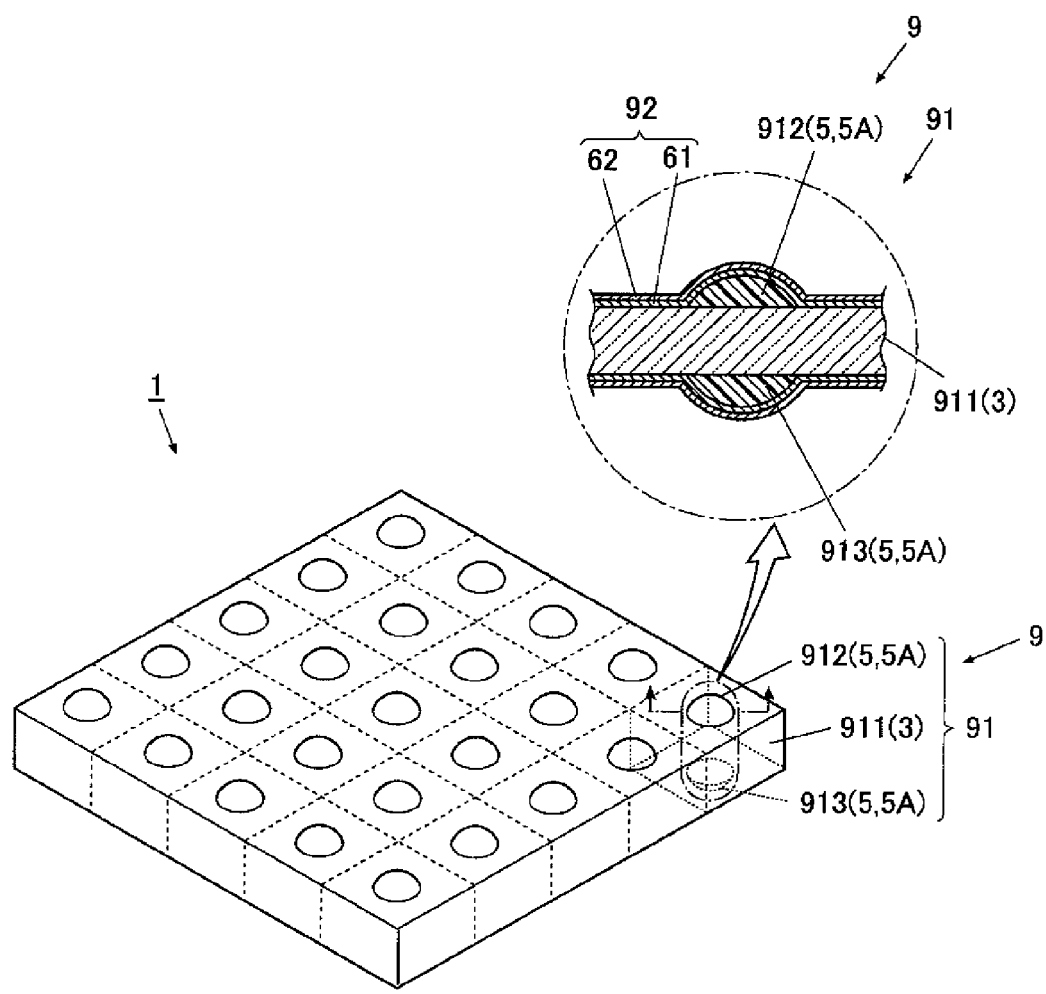
FIG. 3 is a schematic perspective view of an external appearance of a lens array.

As shown in FIGS. 2 and 3, imaging lens 9 is composed of wafer lens 91 as the base material of the present invention, and anti-reflection layer 92, which is formed on both front and back surfaces of the aforesaid wafer lens 91.

Wafer lens 91 is composed of tabular first optical member 911, and second and third optical members 912 and 913, which form optical surfaces by joining to the front and back surfaces of the aforesaid first optical member 911.

This wafer lens 91 is, as shown in FIG. 3, designed so that wafer lens 91 is integrally formed with other wafer lenses 91 as lens array 1, after which, at a time of shipping of the product, wafer lens 91 is cut in a lattice shape and divided into each set of second and third optical members 912 and 913, to produce a product (wafer lens 91).

Lens array 1 is composed of rectangular glass board 3, which forms first optical members 911 after glass board 3 being divided, and multiple lens parts 5, which form second and third optical members 912 and 913, and has a constitution in which multiple lens parts 5 are arranged in an array shape on glass board 3. Lens part 5 may be formed on the front surface or on both front and back surfaces of glass board 3. Further, lens part 5 may have fine structures such as diffraction grooves and steps on the front surface of the optical surface.

<Lens Part>

Lens part 5 is formed with resin 5A having a glass transition temperature of not less than 290° C. or having the glass transition temperature of higher than or equal to (film-forming temperature Tb of anti-reflection layer 92 −50° C.). The glass transition temperature can be detected by measuring it in a range of 30 to 290° C. using an instrument such as a thermo-mechanical analyzer.

As this resin 5A, a resin material containing curable resin can be used, but it is necessary to select resin having a glass transition temperature of not less than 290° C. or having the glass transition temperature of higher than or equal to (film-forming temperature Tb of anti-reflection layer 92 −50° C.) after the glass transition temperature is determined via the above analysis equipment. The curable resin can be classified roughly into light curable resin and heat curable resin. The light curable resin can be reacted and cured by radical polymerization if the resin is aeryl resin or allyl resin. If the light curable resin is epoxy type resin, the resin can be reacted and cured by cation polymerization. On the other hand, the heat curable resin can also be cured by addition polymerization like silicone or the like in addition to the above radical polymerization or cation polymerization. In addition, other resin such as organic-inorganic hybrid type resin may be used.

(Acrylic Based Resin)

(Meth)acrylate below which is produced by a conventional production method can be used in polymerization reaction without limitation. Listed are ester (meth)acrylate, urethane (meth)acrylate, epoxy (meth)acrylate, ether (meth)acrylate, alkyl (meth)acrylate, alkylene (meth)acrylate, (meth)acrylate having aromatic ring, and (meth)acrylate having aliphatic structure. These may be employed individually or in combinations of at least two types.

In view of having high heat resistance, (meth)acrylate having aliphatic structure is preferred and aliphatic structure may contain oxygen atom or nitrogen atom. Specific example includes cyclohexyl (meth)acrylate, cyclopentyl (meth)acrylate, cycloheptyl (meth)acrylate, bicycloheptyl (meth)acrylate, tricyclodecyl (meth)acrylate, tricyclodecan dimethanol (meth)acrylate, isoboronyl (meth)acrylate and di(meth)acrylate of hydrogenerated bisphenols. Especially preferred is (meth)acrylate having adamantane skeleton. Specific example include: 2-alkyl-2-adamantyl (meth)acrylate (JP-A No. 2002-193883), adamantyl di(meth)acrylate (JP-A No. 57-500785), adamantyl dicarboxylic acid dialyl (JP-A No. 60-100537), perfluoroadamantyl acrylic ester (JP-A No. 2004-123687), 2-methyl-2-adamantyl methacrylate, 1,3-adamantane diol diacrylate, unsaturated carboxylic acid adamantly ester (JP-A No. 2000-119220) (produced by Shin-Nakamura Chemical Co., Ltd.), 3,3'-dialkoxycarbonyl-1,1'-biadamantane (JP-A No. 2001-253835), 1,1'-biadamantane compound (U.S. Pat. No. 3,342,880), tetraadamantane (JP-A No. 2006-169177), curable resin having adamantine skelton without having aromatic ring such as 2-alkyl 2-hydroxy adamantine, 2-alkylene adamanatane, 1,3-adamantane dicarbonic acid di-ter-butyl (JP-A No. 2001-322950), bis(hydroxyphenyl) adamantanes or bis(glycigyloxyphenyl)adamantine (JP-A Nos. 11-35522, 10-130371).

Further, other reactive monomer can be contained. Listed as (meth)acrylates are: methyl acrylate, methyl methacrylate, n-butyl acryate, n-butyl methacryate, 2-ethylhexyl acrylate, 2-ethylhexyl methacrylate, isobutyl acrylate, isobutyl methacrylate, tert-butyl acrylate, tert-butyl methacrylate, phenyl acrylate, phenyl methacrylate, benzyl acrylate, benzyl methacrylate, cyclohexyl acrylate and cyclohexyl methacrylate.

As polyfunctional (meth)acrylate, listed are: trimethylolpropane tri(meth)acrylate, pentaerythritol tetra(meth)acrylate, pentaerythritol tri(meth)acrylate, dipentaerythritol hexa(meth)acrylate, dipentaerythritol penta(meth)acrylate, dipentaerythritol tetra(meth)acrylate, dipentaerythritol tri(meth)acrylate, tripentaerythritol octa(meth)acrylate, tripentaerythritol cepta(meth)acrylate, tripentaerythritol hexa(meth)acrylate, tripentaerythritol penta(meth)acrylate, tripentaerythritol tetra(meth)acrylate, and tripentaerythritol tri(meth)acrylate.

(Allyl Ester Based Resin)

Allyl ester based resin is a curable resin by radical polymerization containing allyl ester compound. Specific example is listed below, without being restricted thereto.

Specific example include: (meth)allyl ester containing bromide and without containing aromatic ring (JP-A No. 2003-66201), allyl(meth)acrylate (JP-A No. 5-286896), allyl ester resin (JP-A Nos. 5-286896, 2003-66201), copolymer compound of acryl acid ester and unsaturated compound containing epoxy group (JP-A no. 2003-128725), acrylate compound (JP-A 2003-147072) and acryl ester compound (JP-A No. 2005-2064).

(Epoxy Resin)

As epoxy resin, compound containing epoxy groups and polymerizable by light or heat can be usable without limitation. As initiator for curing, acid anhydride or cation generator can be employable.

Epoxy resin is preferable to exhibit excellent molding accuracy due to its low shrinkage percentage by curing.

As epoxy resin, listed are novolac phenol type epoxy resin, biphenyl type epoxy resin, and dicyclopentadiene type epoxy resin. Specific example include: bisphenol F diglycigyl ether, bisphenol A diglycigyl ether, 2,2'-bis(4-glycigyl oxycyclohexyl) propane, 3,4-epoxycyclohexylmethyl-3,4-epoxycyclohexane carboxylate, vinylcyclohexene dioxide, 2-(3,4-epoxycyclohexyl)-5,5-spiro-(3,4-epoxycyclohexane)-1,3-dioxane, bis(3,4-epoxycyclohexyl) adipate, and 1,2-cyclopropane dicarboxylic acid bisglycigyl ester.

Hardner is used as constitutions of curable resin material and is not particularly limited. When a transmittance is compared between curable resin material and optical material after adding additive in the present invention, hardner is not included in additive. As hardner, acid anhydride hardner or phenol hardner can be preferably employed. Specific example of acid anhydride hardner include: phthalic anhydride, maleic anhydride, trimellitic anhydride, pyromellitic anhydride, hexahydro phthalic anhydride, 3-methyl-hexahydro phthalic anhydride, 4-methyl-hexahydro phthalic anhydride, or mixture of 3-methyl-hexahydro phthalic anhydride and 4-methyl-hexahydro phthalic anhydride, tetrahydro phthalic anhydride, Nadic anhydride and Nadic methylanhydride. Further, a hardening accelerator can be added as appropriate. Hardening accelerator is not limited, as long as hardenability is good, no coloration occurs and the transparency of heat curable resins is not adversely affected. Specific example include: imidazoles such as 2-ethyl-4-methylimidazole (2E4MZ), bicyclic amidines and their derivatives such as tertiary amine, quarterly ammonium salt and diazabicycloundecene, phosphine, and phosphonium salt. This can be used alone or in combination of 2 or more.

(Silicone Based Resin)

Silicone based resin is polymer having siloxane bond (Si—O—Si) as main chain. Specifically silicone based resin comprising predetermined amount of polyorganosiloxane resin (for example disclosed in JP-A No. 6-9937) is usable as silicone based resin.

Heat curable polyorganosiloxane resin is not limited to species as long as it can make three-dimensional network structures by continuous hydrolysis-dehydration condensation reaction via heating. Generally it has a property to be hardened by heating at high temperature in long term and once it is hardened, difficult to be softened again.

Such polyorganosiloxane resin has a structure represented by Formula (A) as constituent unit and its shape may be any of chain, ring or network.

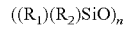  Formula (A)

In Formula (A), $R_1$ and $R_2$ each represent a monovalent hydrocarbon group having same or different substituent or unsubstituted groups. Specific example include: alkyl group such as methyl group, ethyl group, propyl group, butyl group; alkenyl group such as vinyl group, allyl group; aryl group such as phenyl group, tryl group; cycloalkyl group such as cyclohexyl group, cyclooctyl group; or group which substitutes hydrogen atom bonded to carbon atom in above group by halogen atom, cyano group or amino group such as chloromethyl group, 3,3,3-triflioropropyl group, cyanomethyl group, γ-aminopropyl group, N-(β-aminoethyl)-γ-aminopropyl group. $R_1$ and $R_2$ each may be a group selected from hydroxyl group and alkoxy group. In Formula (A), n represents an integer of 50 or more.

Generally polyorganosiloxane resin is used by solving in hydrocarbon solvents such as toluene, xylene, petronolium solvent or mixture thereof with polar solvent. Further different compositions can be mixed, provided that they can be mutually soluble.

A method for producing polyorganosiloxane resin is not limited and any one of well-known method can be usable. For example, it is available by hydrolysis or alcoholysis of alone or mixture of two or more organosiloxanes. Generally polyorganosiloxane resin contains hydrolysable group such as silanol group or alkoxy group and a content of these groups is 1-10% by mass converted into silanol group.

This reaction is generally carried out under existence of solvent which can solve organosiloxane. Moreover, it can be obtained by a method of synthesizing a block copolymer via co-hydrolysis of linear polyorganosiloxane which contains hydroxyl group, alkoxy group or halogen atom at the chain ends with organotrichlorosilane. Polyorganosiloxane obtained above generally contains residual HCl. In view of high storage stability, amount of HCl is 10 ppm or less, preferably 1 ppm or less in the composition of the present embodiment.

Anti-reflection layer 92 is formed on wafer lens 91 with an inorganic material. In the case where resin 5A of lens part 5 has the glass transition point, film-forming temperature Tb of anti-reflection layer 92 is lower than or equal to (the glass transition point of resin 5A+50° C.), and is higher than or equal to (Ta−60° C.) with respect to reflow process temperature Ta to be described. Incidentally, in the present embodiment, anti-reflection layer 92 has a double-layered structure. Specifically, with respect to wafer lens 91, first layer 61 is formed through fluorine-substituted layer 500, and second layer 62 is formed on first layer 61.

First layer 61 is a layer composed of a material having a high refs active index of 1.7 or higher, and is preferably composed of any one of $Ta_2O_5$, a mixture of $Ta_2O_5$ and $TiO_2$, $ZrO_2$, and a mixture of $ZrO_2$ and $TiO_2$. First layer 61 may be composed of $TiO_2$, $Nb_2O_3$, or $HfO_2$. Second layer 62 is a layer composed of a material having a low refractive index of less than 1.7, and is preferably composed of $SiO_2$.

Both of first layer 61 and second layer 62 of anti-reflection layer 92 are formed by a method such as a vapor deposition, and, for details, first layer 61 and second layer 62 are formed while maintaining the film-forming temperature in a range of −40 to +40° C. (preferably −20 to +20° C.) with respect to a melting temperature of conductive paste such as a soldier, which is subjected to a reflow process (this will be further described later).

In wafer lens 91, first layer 61 and second layer 62 may be alternately further laminated on first layer 61 and second layer 62 to make anti-reflection layer 92 a 2- to 7-layer structure as a whole. In this case, a layer directly contacting wafer lens 91 and fluorine-substituted layer 500 may be, corresponding to types of wafer lens 91, a layer composed of a material having a high refractive index (first layer 61), or may be a layer composed of a material having a low refractive index (second layer 62). In the present embodiment, a layer directly contacting wafer lens 91 is a layer composed of a material having a high refractive index.

In producing the above lens array 1, as a molding mold, master molding mold (hereinafter referred simply to "master") 10, and sub-master molding mold (hereinafter referred simply to "sub-master") 20 drawn in FIG. 4 are used.

<Master>

Figure 4A:
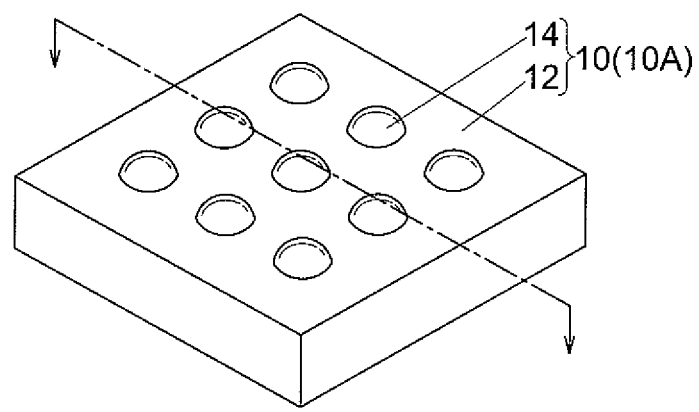
FIG. 4 is perspective views of a schematic constitution of a master and a sub-master.

As shown in FIG. 4a, in master 10, multiple convex parts 14 are formed in an array shape on base part 12 having a rectangular parallelepiped shape. Convex part 14 is a part corresponding to lens part 5 of lens array 1, and is projected in substantially hemispherical shape. The outer shape of master 10 may be a quadrilateral or a circular as shown in FIG. 4a. The scope of right of the present invention is not limited by the above difference in shape, but after this, description will be made with a quadrilateral as an example.

Figure 4B:
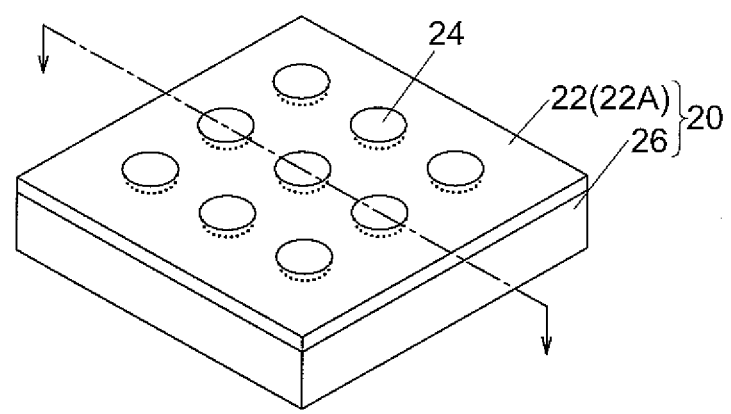
Figure 5A:
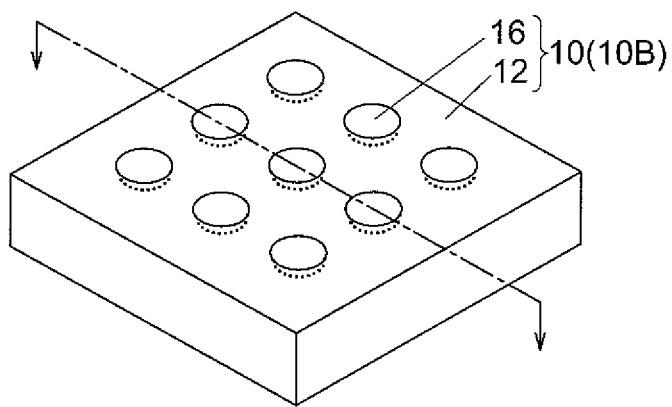
FIG. 5 is perspective views of a schematic constitution of a master, a sub-master and a sub-sub-master.

The optical surface shape (a surface shape) of master 10 may be, as shown in FIG. 4a, a convex shape in which convex parts 14 are formed, or may be, as shown in FIG. 5a, a concavo shape in which multiple concavo parts 16 are formed. However, the surface shape of these convex part 14 and concavo part 16 (a molding surface) is designed to be a positive shape corresponding to the optical surface shape (an opposite surface shape to glass board 3) of lens part 5 which will be molded and transferred on glass board 3. In the following description, two masters 10 are differentiated by referring to master 10 of FIG. 4 as "master 10A" and master 10 of FIG. 5 as "master 10B".

As a material of master 10A, in the case of creating an optical surface shape by machine work such as cutting and grinding, a metal or a metal-glass can be used. When classified, an iron type material and other alloys are included. The iron type material includes hot-die steel, cold-die steel, plastic-die steel, high-speed tool steel, general structural rolled steel, mechanical structural carbon steel, chrome molybdenum steel, and stainless steel. Among them, the plastic-die steel includes pre-hardened steel, hardened and annealed steel, and aging treatment steel. The pre-hardened steel includes SC type, SCM type, and SUS type. More specifically, SC type includes PXZ. The SCM type includes HPM2, HPM7, PX5, and IMPAX. The SUS type includes HPM38, HPM77, S-STAR, G-STAR, STAVAX, RAMAX-S, and PSL. The iron type alloy is disclosed in JP-A No. 2005-113161 and JP-A No. 2005-206913. As non-iron type alloy, mainly copper alloy, aluminum alloy, and zinc alloy are well known. Examples include alloys disclosed in JP-A No. H10-219373, and JP-A No. 2000-176970. As the metal glass material, for example, PdCuSi, and PdCuSiNi are suitable, since they have high machinability in diamond cutting with little wear on tools. Further, an amorphous alloy of electroless or electrolytic nickel-phosphor plating or the like is also suitable, since they have good machinability in diamond cutting. These materials having high machinability may constitute whole master 10A, or in particular, may only cover the surface of optical transfer surface by a method such as a plating method and a sputtering method.

As a material of master 10, glass may be used, though it may be somewhat difficult in machine work. If glass is used for master 10, a merit that UV light can be transmitted can be obtained. The type of the glass is not particularly limited as long as it is commonly used.

In particular, a material for mold forming includes a material such as low melting point glass and metal glass in which fluidity can be readily secured at a low temperature. The use of the low melting point glass has an advantage that irradiation can be made from a sample die side when molding a UV curable material. The low melting point glass includes a glass having the glass transition point of about 600° C. or lower, and glass composition of $ZnO$—$PbO$—$B_2O_3$, $PbO$—$SiO_2$—$B_2O_3$, or $PbO$—$P_2O_5$—$SnF_2$. The glass which melts at 400° C. or lower includes $PbF_2$—$SnF_2$—$SnO$—$P_2O_5$ and materials having a similar structure thereof. Specific materials include S-FPL51, S-FPL53, S-FSL 5, S-BSL 7, S-BSM 2, S-BSM 4, S-BSM 9, S-BSM10, S-BSM14, S-BSM15, S-BSM16, S-BSM18, S-BSM22, S-BSM25, S-BSM28, S-BSM71, S-BSM81, S-NSL 3, S-NSL 5, S-NSL36, S-BAL 2, S-BAL 3, S-BAL11, S-BAL12, S-BAL14, S-BAL35, S-BAL41, S-BAM 3, S-BAM 4, S-BAM12, S-BAH10, S-BAH11, S-BAH27, S-BAH28, S-BAH32, S-PHM52, S-PHM53, S-TIL 1, S-TIL 2, S-TIL 6, S-TIL25, S-TIL26, S-TIL27, S-TIM 1, S-TIM 2, S-TIM 3, S-TIM 5, S-TIM 8, S-TIM22, S-TIM25, S-TIM27, S-TIM28, S-TIM35, S-TIM39, S-TIH 1, S-TIH 3, S-TIH 4, S-TIH 6, S-TIH10, S-TIH11, S-TIH13, S-TIH14, S-TIH18, S-TIH23, S-TIH53, S-LAL 7, S-LAL 8, S-LAL 9, S-LAL10, S-LAL12, S-LAL13, S-LAL14, S-LAL18, S-LAL54, S-LAL56, S-LAL58, S-LAL59, S-LAL61, S-LAM 2, S-LAM 3, S-LAM 7, S-LAM51, S-LAM52, S-LAM54, S-LAM55, S-LAM58, S-LAM59, S-LAM60, S-LAM61, S-LAM66, S-LAH51, S-LAH52, S-LAH53, S-LAH55, S-LAH58, S-LAH59, S-LAH60, S-LAH63, S-LAH64, S-LAH65, S-LAH66, S-LAH71, S-LAH79, S-YGH51, S-FTM16, S-NBM51, S-NBH 5, S-NBH 8, S-NBH51, S-NBH52, S-NBH53, S-NBH55, S-NPH 1, S-NPH 2, S-NPH53, P-FK01S, P-FKH2S, P-SK5S, P-SK12S, P-LAK13S, P-LASF03S, P-LASFH11S, and P-LASFH12S, but are not particularly limited to them.

The metal glass can also be readily molded by molding in a similar manner. As the metal glass, structures are disclosed in each patent document such as JP-A No. H8-109419, JP-A No. H8-333660, JP-A No. H10-81944, JP-A No. H10-92619, JP-A No. 2001-140047, JP-A No. 2001-303218, and JP-A No. 2003-534925, but they are not particularly limited to them.

The optical surface of master 10A may be a surface where single convex part 14 is formed, or may be a surface where, as shown in FIG. 4a, multiple convex parts 14 are formed in an array shape. As a method for creating the optical surface of master 10A, there exists a diamond cutting work.

When the optical surface of master 10A is a surface where single convex part 14 is formed, the optical surface can be achieved by performing cutting work with a diamond tool using a material such as a nickel-phosphor or aluminum alloy, free-cuffing brass, metal glass, and amorphous alloy as a mold material.

Figure 6A:
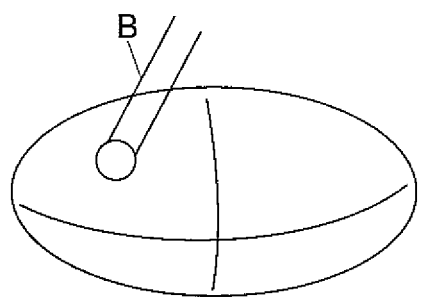
FIG. 6 is a figure describing a method for creating a molding surface by a ball end mill.
Figure 6B:
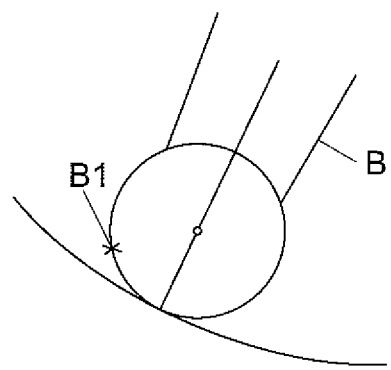
Figure 6C:
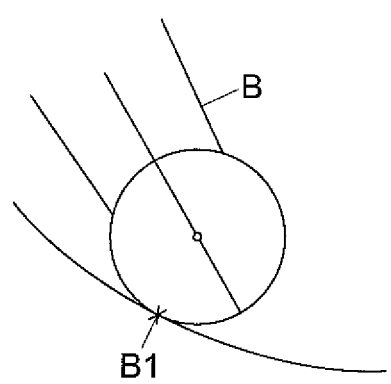

When the optical surface of master 10A is a surface where multiple convex parts 14 are formed, the optical surface shape is made by cutting work using ball-end mill B (refer to FIG. 6) in which the cutting blade is formed of diamond. In this case, since the cutting blade of the tool is not a perfect circular arc and the blade causes an error in process shape depending on the places where the cutting blade is used, it is desired to process while controlling the slant of the tool so that an identical position of the cutting blade is used when any part of the optical surface shape is cut.

Specifically, first of all, the center of the circular arc of the blade edge of ball end mill B is positioned, with three axes of translation, on a normal line of the work surface at a contact point between a work and a tool. Further, by using an axis of rotation, position B1 where the cutting blade is used is positioned so that position B1 comes to a contact point between a work and a tool. By successively controlling such tool position, the cutting process of the optical surface shape is carried out.

In order to carry out such a process, the processing machine requires at least three degrees of translational freedom and one degree of rotational freedom, and then, the process can not be realized without a processing machine having a total of four or more degrees of freedom. Therefore, in the case of molding the optical surface of master 10A, a processing machine having four or more degrees of freedom is used.

<Sub-Master>

As shown in FIG. 4b, sub-master 20 is composed of sub-master molding part 22 and sub-master board 26. In sub-master molding part 22, multiple concavo parts 24 are formed in an array shape. The surface shape of concavo part 24 (a molding surface) is designed to be a negative shape corresponding to lens part 5 of lens array 1, and is indented in substantially hemispherical shape in this figure.

<<Sub-Master Molding Part>>

Sub-master molding part 22 is formed of resin 22A. As resin 22A, the resin having an excellent demolding property, in particular, transparent resin is preferred. The resin is superior in a point that the resin can be demolded without applying a mold release agent. As the resin, any of light curable resin, heat curable resin, or thermoplastic resin may be used.

The light curable resin includes fluorine type resin, and the heat curable resin includes fluorine type resin and silicone type resin. Of these, the resin having an excellent demolding property, that is, having low surface energy when being cured, is preferred. The thermoplastic resin includes olefin type resin, which is transparent and has a relatively excellent demolding property, such as polycarbonate, and cycloolefin polymer. The demolding property is excellent in the order of fluorine type resin, silicone type resin, and olefin type resin. In this case, sub-master board 26 may not be used. The use of such resin becomes further superior in demolding, since the resin is allowed to be bent.

The fluorine type resin, silicone type resin and thermoplastic resin will now be detailed.

(Fluorine Type Resin)

As specific examples of fluorine type resin, listed are PTFE (polytetrafluoroethylene), PFA (tetrafluoroethylene-perfluoroalkyl vinyl ether copolymer), FEP (tetrafluoroethylene-hexafluoropropylene copolymer (4,6 fluorinated)), ETFE (tetrafluoroethylene-ethylene copolymer), PVDF (polyvinylidene fluoride (2 fluorinated)), PCTFE (polychloro trifluoroethylene (3 fluorinated)), ECTFE (chlorotrifluoroethylene-ethylene copolymer) and PVF (polyvinyl fluoride).

Fluorine type resin has advantage to demolding property, heat resistance, chemical resistance, insulation and low friction. However, fluorine type resin has disadvantage to transparency due to crystalline. Also, high temperature (about 300° C.) is needed for molding due to its high melting point.

As to method of molding, cast molding, injection molding, extrusion molding, blow molding, transfer molding can be employable. Among fluorine type resins, FEP, PFA and PVDF are preferable which exhibits excellent light transparency and injection molding or extrusion molding can be employable.

Examples of melt moldable grade include Fluon PFA (produced by Asahi Glass Co., Ltd) and Dyneon PFA, Dyneon THV (produced by Sumitomo 3M Ltd.). Especially, Dtneon THV series is preferable because it can be molded at relatively low temperature due to low melting point (about 120° C.) and exhibits excellent transparency.

Further, as heat curable amorphous fluorine type resin, CYTOP grade S is preferred in terms of excellent transparency and demolding property.

(Silicone Type Resin)

Silicone type resin comprises one-component moisture curable type, two-component addition reaction type and two-component condensation reaction type.

Silicone type resin has advantage such as demolding property, flexibility, heat resistance, flame resistance, moisture permeability, low water absorbability, and many transparent grades, however, also disadvantage such as large linear expansion coefficient.

Especially, silicone type resin for moulage containing PDMS (polydimethyl siloxane) structure is preferable in terms of good demolding property, such as high transparent grade of RTV elastomer. Specific examples include: TSE3450 (two-component mixing, addition type) (produced by Momentive Performance Materials Inc.), ELASTOSIL M 4647 (two-component PTV silicone rubber) (produced by Wacker Asahikasei Silicone Co., Ltd.), KE-1603 (two-component, mixing, addition type RTV rubber) (produced by Shin-Etsu Silicones), SH-9555 (two-component, addition type RTV rubber) (produced by Dow Corning Toray Co., Ltd.), SYLGARD 184, SILPOT 184, and WL-5000 series (photosensitive silicone buffer material, which can be patterned by UV).

In case of two-component type RTV rubber, method of molding is curing at room temperature or heating.

(Thermoplastic Resin)

As thermoplastic resin, listed is an alicyclic hydrocarbon-based resin, an acrylic resin, a polycarbonate resin, a polyester resin, a polyether resin, a polyimide resin, or a polyimide resin. Of these, an alicyclic hydrocarbon-based resin is specifically preferably used. When a sub-master 20 is constituted by the thermoplastic resin, conventional injection technology can be converted and sub-master 20 can be prepared easily. Further, when thermoplastic resin is an alicyclic hydrocarbon-based resin, life of sub-master 20 becomes longer due to its extremely low hygroscopic property. Further, alicyclic hydrocarbon-based resin such as cycloolefin resin exhibits excellent light fastness and light transparency. Therefore, even when a light source such as UV having short wave length is used for curing an actinic energy radiation curable resin, resin can be employable in long time due to less deterioration.

As the alicyclic hydrocarbon-based resin, those represented by following Formula (1) are exemplified.

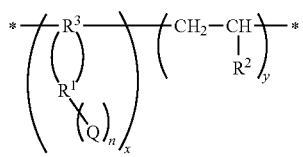

(1)

In above Formula (1), x and y each represents a copolymerization rate and an integer satisfying the relationship: $0/100 \leq y/x \leq 95/5$. And, n represents 0, 1, or 2 and the substitution number of the substituent Q. $R^1$ represents one or at least 2 types of groups of a valence of (2+n) selected from the group of the hydrocarbon groups of a carbon number of 2-20. $R^2$ represents a hydrogen atom or one or at least 2 types of monovalent groups selected from the structure groups of a carbon number of 1-10 containing carbon and hydrogen. $R^3$ represents one or at least 2 types of divalent groups selected from the group of the hydrocarbon groups of a carbon number of 2-20. Q represents one or at least 2 types of monovalent groups selected from the structure groups represented by $COOR^4$ ($R^4$ represents a hydrogen atom or one or at least 2 types of monovalent groups selected from the structure groups of a carbon number of 1-10 containing hydrocarbon).

In above Formula (1), $R^1$ is preferably one or at least 2 types of divalent groups selected from the group of the hydrocarbon groups of a carbon number of 2-12, being more preferably represented by following Formula (2) (wherein p represents an integer of 0-2):

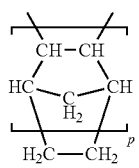

(2)

which is a divalent group. A divalent group having p representing 0 or 1 in Formula (2) is more preferable. With regard to the structure of $R^1$, only one type may be used or at least 2 types may be used in combination. Examples of $R^2$ include a hydrogen atom, a methyl group, an ethyl group, an n-propyl group, an i-propyl group, an n-butyl group, and a 2-methypropyl group. A hydrogen atom or a methyl group is more preferable. A hydrogen atom is most preferable. With regard to examples of $R^3$, as preferable examples of the structure units containing this group, when n=0, for example, following Formulas (a), (b), and (c) (herein, in Formulas (a)-(c), R1 is as described above):

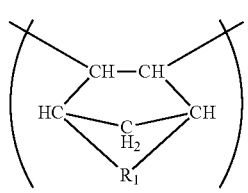

(a)

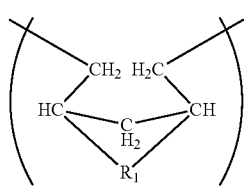

(b)

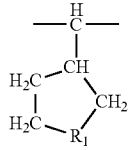

(c)

are cited. Further, n preferably represents 0.

In the present embodiment, the type of copolymerization is not specifically limited, and therefore well-known copolymerization types such as random copolymerization, block copolymerization, or alternating copolymerization are applicable. Of these, random copolymerization is preferable.

Further, a polymer used in the present embodiment may have a repeating structure unit derived from another copolymerizable monomer if appropriate, as long as no physical properties of a product obtained by the molding method of the present embodiment are impaired. Its copolymerization rate is not specifically limited but is preferably at most 20 mol %, more preferably at most 10 mol %. When copolymerization is performed further, optical characteristics may be impaired and also a highly precise molding die may not be obtained. In this case, the type of copolymerization is not specifically limited, but random copolymerization is preferable.

As another example of a preferable thermoplastic alicyclic hydrocarbon-based polymer applied to the sub-master 20, a polymer is exemplified in which a repeating unit having an alicyclic structure contains a repeating unit (a) having an alicyclic structure represented by following Formula (4) and a repeating unit (b) of a chain structure represented by following Formula (5), Formula (6), or Formula (7) at a total content of at least 90% and further the content of the repeating unit (b) is 1% by mass—less than 10% by mass.

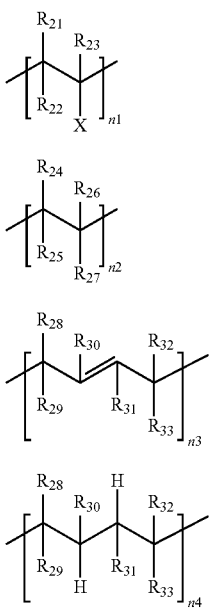

In Formulas (4), (5), (6), and (7), $R_{21}$-$R_{33}$ each independently represents a hydrogen atom, a chain hydrocarbon group, a halogen atom, an alkoxy group, a hydroxy group, an ether group, an ester group, a cyano group, an amino group, an imide group, a silyl group, or a chain hydrocarbon group substituted with a polar group (for example, a halogen atom, an alkoxy group, a hydroxy group, an ester group, a cyano group, an amide group, an imide group, or a silyl group). Specifically, as the halogen atom, a fluorine atom, a chlorine atom, a bromine atom, and an iodine atom can be listed. As the chain hydrocarbon group substituted with a polar group, for example, cited is a halogenated alkyl group having a carbon atom number of 1-20, preferably 1-10, more preferably 1-6. As the chain hydrocarbon group, for example, cited are an alkyl group having a carbon atom number of 1-20, preferably 1-10, more preferably 1-6 and an alkenyl group having a carbon atom number of 2-20, preferably 2-10, more preferably 2-6.

X in above Formula (4) represents an alicyclic hydrocarbon group and the number of carbon atoms constituting this group is commonly 4-20, preferably 4-10, more preferably 5-7. When the number of carbon atoms constituting an alicyclic structure is allowed to fall within this range, birefringence can be reduced. Further, the alicyclic structure is not limited to a monocyclic structure and may be a polycyclic structure such as, for example, a norbornane ring.

The alicyclic hydrocarbon group may have a carbon-carbon unsaturated bond. The content thereof is at most 10% of the total carbon-carbon bonds, preferably at most 5%, more preferably at most 3%. When the carbon-carbon bond in the alicyclic hydrocarbon group is allowed to fall within this range, transparency and heat resistance are enhanced. Further, carbon atoms constituting the alicyclic hydrocarbon group may be bonded to a hydrogen atom, a hydrocarbon group, a halogen atom, an alkoxy group, a hydroxy group, an ester group, a cyano group, an amide group, an imide group, a silyl group, or a chain hydrocarbon group substituted with a polar group (a halogen atom, an alkoxy group, a hydroxy group, an ester group, a cyano group, an amide group, an imide group, or a silyl group). Of these, a hydrogen atom and a chain hydrocarbon group having a carbon atom number of 1-6 are preferable in terms of heat resistance and small water absorbability.

Further, above Formula (6) has a carbon-carbon unsaturated bond in the main chain and Formula (7) has a carbon-carbon saturated chain in the main chain. Herein, when transparency and heat resistance are strongly required, the content rate of such an unsaturated bond is commonly at most 10% of the total carbon-carbon bonds constituting the main chain, preferably at most 5%, more preferably at most 3%.

In the present embodiment, in an alicyclic hydrocarbon-based copolymer, the total content of the repeating unit (a) having an alicyclic structure represented by Formula (4) and the repeating unit (b) of a chain structure represented by Formula (5), formula (6), or Formula (7) is, in terms of mass, commonly at least 90%, preferably at least 95%, more preferably at least 97%. When the total content is specified to fall within the range, small birefringence properties, heat resistance, small water absorbability, and mechanical strength are highly balanced.

As the production method for producing the above alicyclic hydrocarbon-based copolymer, a method is cited in which an aromatic vinyl-based compound and another monomer which is copolymerizable are copolymerized together, and then the carbon-carbon unsaturated bonds of the main chain and the aromatic ring are hydrogenated.

The molecular weight of the preferable pre-hydrogenation block copolymer is from 1,000 to 1,000,000, more preferably from 5,000 to 500,000, and particularly preferably from 10,000 to 300,000 in terms of Mw of polystyrene (or polyisoprene) measured by GPC. The mechanical strength is lowered when the Mw of block copolymer is too low, and the hydrogen adding reaction rate is lowered when the Mw is too high.

As the specific example of the aromatic vinyl compound used in the above method, styrene, α-methylstyrene, α-ethylstyrene, α-propylstyrene, α-isopropylstyrene, α-t-butylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlrostyrene, dichlorostyrene, monofluorostyrene, and 4-phenylstyrene are cited. Among them, styrene, 2-methylstyrene, 3-methylstyrene and 4-methylstyrene are preferable. These aromatic vinyl compounds can be used individually or in combinations of at least 2 types.

Such another monomer which is copolymerizable is not specifically limited but a chain vinyl compound or a chain conjugated diene compound is used. When such a chain conjugated diene is used, handling in the production process is improved and the strength properties of an obtained alicyclic hydrocarbon-based copolymer are increased.

Specific examples of the chain vinyl compound include, for example, a chain olefin monomer such as ethylene, propylene, 1-butene, 1-pentene, or 4-methyl-1-pentene; a nitrile-based monomer such as 1-cyanoethylene(acrylonitrile), 1-cyano-1-methylethylene (methacrylonitrile), or 1-cyano-1-chloroethylene(α-chloroacrylonitrile); a (meth)acrylic acid ester-based monomer such as 1-(methoxycarbonyl)-1-methylethylene (methacrylic acid methyl ester), 1-(ethoxycarbonyl)-1-methylethylene (methacrylic acid ethyl ester), 1-(propoxycarbonyl)-1-methylethylene (methacrylic acid propyl ester), 1-(butoxycarbonyl)-1-methylethylene (methacrylic acid butyl ester), 1-methoxycarbonylethylene (acrylic acid methyl ester), 1-ethoxycarbonylethylene (acrylic acid ethyl ester), 1-propoxycarbonylethylene (acrylic acid propyl ester), or 1-butoxycarbonylethylene (acrylic acid butyl ester); and an unsaturated fatty acid-based monomer such as 1-carboxyethylene (acrylic acid), 1-carboxy-1-methylethylene (methacrylic acid), or maleic anhydride. Of these, a chain olefin monomer is preferable, and ethylene, propylene, and 1-butene are specifically preferable.

The chain conjugated diene includes, for example, 1,3-butadiene, isoprene, 2,3-dimethyl-1,3-butadiene, 1,3-pentadiene, and 1,3-hexadiene. Of these chain vinyl compounds and chain conjugated dienes, the chain conjugated dienes are preferable, and butadiene and isoprene are specifically preferable. These chain vinyl compounds and chain conjugated dienes can be used individually or in combination of at least two types.

Polymerization reaction is not specifically limited to radical polymerization, anionic polymerization, and cationic polymerization, but anionic polymerization is preferable in view of polymerization operations, ease of hydrogenation reaction in a post process, and mechanical strength of a finally-obtained hydrocarbon-based copolymer.

In the case of anionic polymerization, a method such as block polymerization, solution polymerization, or slurry polymerization can be employed in the presence of a polymerization initiator, commonly in a temperature range of 0-200° C., preferably 20-100° C., specifically preferably 20-80° C. However, in view of elimination of reaction heat, solution polymerization is preferable. In this case, an inert solvent capable of dissolving a polymer and a hydrogenated product thereof is used. Examples of the inert solvent used in such solution reaction include an aliphatic hydrocarbon such as n-butane, n-pentane, iso-pentane, n-hexane, n-heptane, or iso-octane; an alicyclic hydrocarbon such as cyclopentane, cyclohexane, methylcyclopentane, methylcyclohexane, or decalin; and an aromatic hydrocarbon such as benzene or toluene. As a polymerization initiator for the above anionic polymerization, usable are, for example, a mono-organolithium compound such as n-butyl lithium, sec-butyl lithium, t-butyl lithium, hexyl lithium, or phenyl lithium; and a polyfunctional organolithium compound such as dilithiomethane, 1,4-diobutane, or 1,4-dilithio-2-ethylcyclohexane.

When hydrogenation reaction of carbon-carbon double bonds in an unsaturated ring such as an aromatic ring and a cycloalkene ring or of unsaturated bonds in the main chain in a copolymer before hydrogenation is carried out, the reaction method and reaction form are not specifically limited, and can be performed based on a well-known method. However, preferable is a hydrogenation method which can increase the hydrogenation rate and also can decrease polymer chain cleavage reaction induced simultaneously with the hydrogenation reaction. A method employing a catalyst containing at least one metal selected from nickel, cobalt, iron, titanium, rhodium, palladium, platinum, ruthenium, and rhenium in an organic solvent is exemplified. The hydrogenation reaction is usually carried out at a temperature of from 10 to 250 and a temperature of from 50 to 200° C. is preferable and that from 80 to 180° C. is more preferable for raising the hydrogenation ratio and inhibiting the polymer cleaving reaction. The pressure of hydrogen is preferably from 0.1 to 30 MPa and more preferably from 1 to 20 MPa and particularly preferably from 2 to 10 MPa from the viewpoint of the above and the operation suitability.

The hydrogenation ratio of thus obtained hydrogenated product at the carbon-carbon unsaturated bond of the main chain and the side chain and the carbon-carbon unsaturated bond of the aromatic ring or cycloalkene ring is preferably not less than 90%, more preferably not less than 95%, and particularly preferably not less than 97% in the value measured by $H^1$ NMR. When the hydrogenation ratio is low, the birefringence properties and thermal stability of the copolymer are lowered.

A method for recovering the hydrogenated product after the hydrogenation reaction is not specifically limited. Generally employed is a method in which the hydrogenation catalyst is removed from the reaction liquid by filtration or centrifugation and the solvent is directly removed by evaporation or a method in which the reaction liquid is poured into a poor solvent of the hydrogenated product to coagulate the hydrogenated product, <<Sub-Master Board>>

Sub-master board 26 is a backing material, by which the molding can be carried out many times, since sub-master 20 is strengthened by pasting resin on the board, even in the case of low strength sub-master 20 with sub-master molding part 22 only.

As sub-master board 26, any of quartz, silicone wafer, metal, glass, or resin may be used as long as exhibiting smoothness.

In view of transparency, in consideration of a point that UV irradiation can be carried out from either above or under sub-master 20, a transparent mold, for example quartz, glass, or transparent resin, is preferable. The transparent resin may be any of thermoplastic resin, heat curable resin, or UV curable resin, and the resin may have an effect of lowering the linear expansion coefficient due to addition of fine particles in the resin. Thus, the use of resin allows easier demolding at a time of demolding, since the resin is more bent than glass. However, since the resin has a large linear expansion coefficient, the resin has a defect that, when heat is generated at UV irradiation, the shape is changed and thereby translation can not be well performed.

Next, a method for producing lens array 1 will be described with reference to FIG. 7.

Figure 7A:
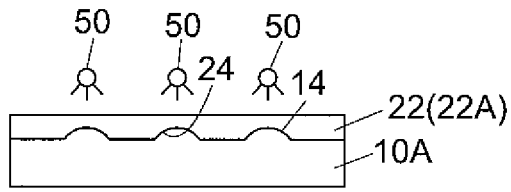
FIG. 7 is a figure describing a method for producing a lens array.

As shown in FIG. 7a, resin 22A is applied to master 10A, after which convex parts 14 of master 10A are transferred to resin 22A, and then resin 22A is cured to form multiple concavo parts 24 on resin 22A. With these processes, sub-master molding part 22 is formed.

Resin 22A may be heat curable or light curable resin, or may be volatile curable resin (for example, HSQ (hydrogen silsesquioxane) resin, which is cured after a solvent is volatilized). In the case of emphasizing high precision molding transferability, preferable is molding using UV curable or volatile curable resin having less influence on thermal expansion of resin 22A, since no heat is used for curing process, but is not limited to them. Resin 22A, which has excellent detachability from master 10A after curing process, is more preferable, since a molding optical surface shape or the like is not changed inadvertently, since a large force is not required at a time of detaching.

In the case where resin 22A (being a material of sub-master molding part 22), and resin 5A (being a material of lens part 5) are the curable resin, the optical surface shape of master 10A (being convex part 14) is preferably designed in anticipation of cure shrinkage of resins 22A and 5A.

In the case of applying resin 22A onto master 10A, a method such as spray coat, spin coat, dropping, and discharge is used. In this case, resin 22A may be applied while vacuuming. If resin 22A is applied while vacuuming, resin 22A can be cured without mixing of air bubbles into resin 22A.

To easily detach cured resin 22A from master 10A, a mold release agent is preferably applied onto the surface of master 10A.

In the case of applying the mold release agent, surface modification of master 10A is carried out. Specifically, OH groups are made stand on the surface of master 10A. Any method for surface modification, such as UV ozone wash, and oxygen plasma ashing, may be used as long as it stands OH groups on the surface of master 10A.

The mold release agent includes materials in which a hydrolyzable functional group is joined to the end, like a structure of silane coupling agent, that is, a material having such a structure that makes a joint by generating a reaction such as dehydration condensation and hydrogen bonding between the mold release agent and OH group existing on the metal surface. In the case of mold release agent having a silane coupling structure at an end and a mold-releasing function at the other end, the more OH groups are formed on the surface of master 10A, the more points on the surface of master 10A where covalent bonds are formed increase, resulting in formation of stronger joints. As a result, durability increases, and thereby, even when molding is repealed many times, mold releasing effect is not lessened. In addition to that, since a primer (such as an under layer, and $SiO_2$ coat) becomes unnecessary, an effect of durability enhancement, while maintaining a thin layer, can be obtained.

The material in which a hydrolyzable functional group is joined to the end includes a material in which the functional group is preferably composed of alkoxysilane group, halogenated silane group, quaternary ammonium salt, and phosphoester group. Further, the material may be a group, such as triazine thiol, which generates a strong joint with a die. Specific materials are the materials having alkoxysilane group (8), or halogenated silane group (9) as represented by the following formulae.

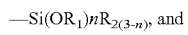
$-Si(OR_1)nR_{2(3-n)}$, and            Formula (8):

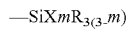
$-SiXmR_{3(3-m)}$            Formula (9):

wherein $R_1$ and $R_2$ are an alkyl group (for example, a methyl group, an ethyl group, a propyl group, or a butyl group), n and m are 1, 2 or 3, and $R_3$ is an alkyl group (for example, a methyl group, an ethyl group, a propyl group, or a butyl group), or an alkoxy group (for example, a methoxy group, an ethoxy group, or a buthoxy group). X is a halogen atom (for example, Cl, Br, or I).

In the case where at least two of $R_1$, $R_2$, $R_3$, or X are joined to Si, they may be differed within the above groups or atoms, for example the two Rms are an alkyl group and an alkoxy group.

The alkoxysilane group —$SiOR_1$ and halogenated silane group —SiX react with water to become —SiOH, which further makes a joint by generating a reaction such as dehydration condensation and hydrogen bonding between the —SiOH and OH group existing on the surface of the molding material such as glass and metal.

FIG. 8 shows a reaction figure between a mold release agent using an alkoxy silane group as an example of a hydrolyzable functional group being joined to the end and the OH group on the surface of master 10A.

In FIG. 8a, —OR represents methoxy (—$OCH_3$) or ethoxy (—$OC_2H_5$), which generates methanol ($CH_3OH$) or ethanol ($C_2H_5OH$) by hydrolysis to become silanol (—SiOH) as shown in FIG. 8b. After that, being subjected to partial dehydration condensation, a silanol condensate is generated as shown in FIG. 8c. Subsequently, the resulting silanol condensate is adsorbed on the surface of master 10 (an inorganic material) by hydrogen bonding with OH groups existing on the surface of master 10 as shown in FIG. 8d, and finally, by dehydration reaction, —O— chemical bonds (covalent bonds) are formed as shown in FIG. 8e. In FIG. 8, a case of an alkoxy silane group is shown, but in the case of halogenated silane, basically a similar reaction is brought about.

Namely, the mold release agents used in the present invention cover master 10A by making chemical bonds on master 10A at one end of the agent and by orienting functional groups at the other end thereof, and thereby a uniform mold releasing layer which is thin and excellent in durability can be formed.

As the structure on the side having the mold releasing function, a group having low surface energy, for example, a fluorine-substituted hydrocarbon or a hydrocarbon is preferable.

(Fluorine Type Mold Release Agent on the Functional Side)

As the fluorine-substituted hydrocarbon, in particular, a fluorine-substituted hydrocarbon having, at one end of its molecular structure, a perfluoro group such as a $CF_3(CF_2)a-$ group and a $CF_3.CF_3.CF(CF_2)b-$ group is preferred. Further, the chain length of the perfluoro group is preferably at least two carbons, and the number of $CF_2$ groups following $CF_3$ group in the $CF_3(CF_2)a-$ is appropriately 5 or more.

The perfluoro group is not necessarily a linear chain, and may have a branched structure. Further, the perfluoro group may have such a structure as $CF_3(CF_2)c-(CH_2)d-(CF_2)e-$, to respond to an environmental problem in recent years. In this case, c is 3 or less, d is an integer (preferably 1), and e is 4 or less.

The above fluorine mold release agent is solid in normal conditions. However, to apply the agent onto the surface of master 10A, it is necessary to dissolve it into an organic solvent to make a solution. As the above solvent, mostly a fluorine hydrocarbon solvent or a fluorine hydrocarbon solvent mixed with a small amount of organic solvent is mixed is appropriate, though it differs depending on a molecular structure of the mold release agent. The concentration of the solvent is not particularly limited, but a low concentration is sufficient and may be 1 to 3% by mass, since the necessary mold releasing film is characterized in that it is particularly thin.

To apply the above solution onto the surface of master 10A, there can be used a usual coating method such as dipping coating, spray coating, brush coating, and spin coating. After the coating, the solvent is generally evaporated by natural drying to make a dry film. At this process, the thickness of the coated film is not particularly prescribed, but is appropriately 20 μm or less.

Specifically included are OPTOOL DSX, DURASURF HD1100, or DURASURF HD2100, manufactured by Daikin Industries Ltd.; NOVEC EGC-1720, manufactured by Sumitomo 3M Ltd.; vapor deposition of triazintiol, manufactured by Takeuchi Vacuum Deposition Co., Ltd.; amorphous fluorine CYTOP M-grade, manufactured by AGC; and antifouling coat agent OPC-800, manufactured by NI MATERIAL Co., LTD.

(Hydrocarbon Type Mold Release Agent on the Functional Side)

The hydrocarbon group may be a linear chain such as $C_nH_{2n+1}$, or branched. A silicone type mold release agent is included in this classification.

Heretofore, there has been known many composites as a composite which forms a cured film, which is a composite consisting primarily of organopolysiloxane resin, and has water repellency. For example, in JP-A No. S55-48245, there are proposed composites which form films, which consist of hydroxyl-containing methylpolysiloxane resin, α,ω-dihydroxy diorganopolysiloxane and organosilane, and are excellent in mold releasing properties and antifouling properties, and have water repellency after being cured. In addition, JP-A No. S59-140280, there are proposed composites which are composites in which partially hydrolyzed condensate of organosilane consisting primarily of perfluoroalkyl group-containing organosilane and amino group-containing organosilane is a base compound, and forms a cured film being excellent in water repellency and oil repellency.

Specifically included are MOLDSPAT, manufactured by AGC SEIMICHEMICAL CO., LTD.; ORGATIX SIC-330 and 434, manufactured by Matsumoto Fine Chemical Co., Ltd.; and SR-2410, manufactured by Dow Corning Toray. In addition included, as a self-assembled monolayer, is SAMLAY, manufactured by Nippon Soda Co., Ltd.

In the case that resin 22A is a light curable resin, light is irradiated by lighting up light source 50, which is arranged above master 10A.

Light source 50 includes a high-pressure mercury lamp, a metal halide lamp, a xenon lamp, a halogen lamp, a fluorescent lamp, a black light, a G-lamp, and an F-lamp, and may be a linear light source or a point light source. The high-pressure mercury lamp has narrow spectra at 365 nm and 436 nm. The metal halide lamp is a sort of a mercury lamp, and output in the ultraviolet region is several times higher than that of the high-pressure mercury lamp. The xenon lamp has spectra nearest to that of sunlight. The halogen lamp contains a lot of long wavelength light, and emits mostly near-infrared light. The fluorescent lamp has uniform irradiation intensity in the three primary colors of light. The black light has a peak at 351 nm, and emits near-ultraviolet light of 300 to 400 nm.

In the case of light irradiation from light source 50, multiple linear or point light sources 50 are arranged in a lattice pattern so that light may arrive at the entire surface of resin 22A at a time, or linear or point light source 50 are scanned in parallel to the surface of resin 22A so that light may successively arrive at resin 22A. In this case, the luminance distribution or the illuminance (intensity) distribution is measured, and based on the results of the measurements, the number of irradiation times, the amount of irradiation, irradiation time, or the like are controlled.

After resin 22A having been cured by light (after production of sub-master 20), sub-master 20 may be subjected to post-curing (being a heating process). If the post-curing is caned out, resin 22A of sub-master 20 can be completely cured, and thereby the life of the mold of sub-master 20 can be extended.

In the case that resin 22A is a heat curable resin, resin 22A is heated while controlling the heating temperature and the heating time within the optimum range. Resin 22A can also be formed by a method such as an injection molding, a press molding, and a method for cooling after light irradiation.

Figure 7B:
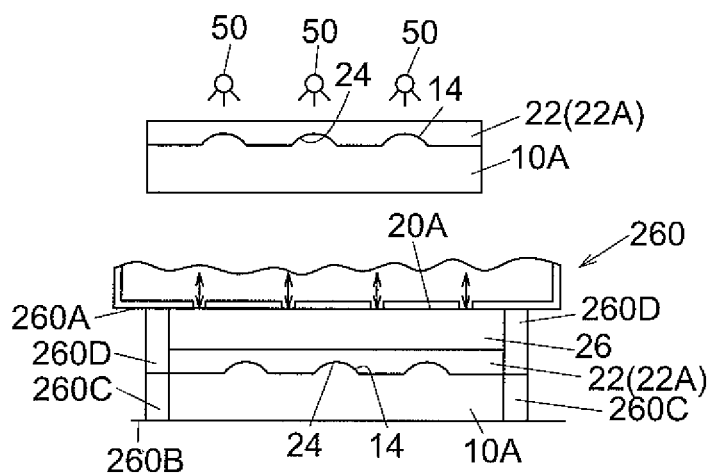

As shown in FIG. 7b, sub-master board 26 is mounted on the back side of sub-master molding part 22 (resin 22A) (being an opposite surface to concave part 24) to back sub-master molding part 22.

Sub-master board 26 may be quartz, or a glass plate, and it is important to have sufficient bending strength and UV transmittance. To increase contact between sub-master molding part 22 and sub-master board 26, a processing such as application of silane coupling agent to sub-master board 26 may be carried out.

As described above, in the case where, after convex part 14 of master 10A is transferred to resin 22A and resin 22A is cured (that is, after formation of sub-master molding part 22), sub-master board 26 is mounted, an adhesive is used.

On the contrary, sub-master board 26 may be mounted before convex part 14 of master 10A is transferred to resin 22A and resin 22A is cured. In this case, without using an adhesive, sub-master board 26 is allowed to stick to resin 22A by adhesive power of resin 22A, or sub-master board 26 is allowed to stick to resin 22A by applying a coupling agent to sub-master board 26 to strengthen the adhesive power. As a method for curing while backing with sub-master board 26, there are methods such as, for example, a method for, using heat curable resin as resin 22A, putting master 10A and sub-master board 26 in a state that the aforesaid resin 22A is charged between master 10A and sub-master board 26, and a method for, as well as using UV curable resin as resin 22A, irradiating UV light to resin 22A from sub-master board 26 side, using a UV transmittance board as sub-master board 26, in a state that the aforesaid resin 22A is charged between master 10A and sub-master board 26.

Further, when sub-master molding part 22 (resin 22A) is backed by sub-master board 26, using conventionally commonly known vacuum chuck apparatus 260, while sucking and holding sub-master board 26 to sucking surface 260A of this vacuum chuck apparatus 260, sub-master molding part 22 is preferably backed by sub-master board 26, with the aforesaid sucking surface 260A being made parallel to the molding surface of convex part 14 of master 10A. With this, back side 20A of sub-master 20 (the surface of sub-master board 26 side) becomes parallel to the molding surface of convex part 14 of master 10A, and thereby, in sub-master 20, the molding surface of concavo part 24 becomes parallel to back side 20A. Therefore, as will be described later, since, when lens part 5 is formed by sub-master 20, the reference plane of sub-master 20, that is, back side 20A, can be made parallel to the molding surface of concavo part 24, it is possible to prevent lens part 5 from being eccentric or from having irregularity in thickness, resulting in improvement of shape accuracy of lens part 5, and thereby, lens performance can be sustained at a high level. Further, since sub-master 20 is sucked and held by vacuum chuck apparatus 260, sub-master 20 can be attached and detached only by ON/OFF of the evacuation. Therefore, an arrangement of sub-master can be easily carried out. When master 10A is also sucked and held by a second vacuum chuck apparatus, which is parallel to sucking surface 260A of the above-mentioned vacuum chuck apparatus 260, in a work of separation of cured sub-master 20 from master 10A, in which carefulness and cautiousness are mostly required, the cured sub-master 20 can be easily detached from the molding apparatus by making the vacuum chuck OFF in a state that both sub-master 20 and master 10A being cured and in close contact to each other, and thereby, the separation work can be surely carried out under a wide space where there is less constraint on apparatus or on another apparatus. Further, if other master and sub-master board are attached to a molding apparatus using a vacuum chuck during the above operation, the molding of the sub-master can be continuously carried out.

The sentence "back side 20A is parallel to the molding surface of concavo part 24" specifically means that back side 20A is perpendicular to a central axis in the molding surface of concavo part 24.

Sucking surface 260A of vacuum chuck apparatus 260 is preferably made of a ceramic material. In this case, since the hardness of sucking surface 260A is increased, and thereby the aforesaid sucking surface 260A becomes difficult to be scratched by attaching and detaching of sub-master 20 (sub-master board 26), the surface accuracy of sucking surface 260A can be sustained at a high level. As such a ceramic material, silicon nitride or sialon is preferably used. In this case, since the coefficient of linear expansion is as small as 1.3 ppm, the flatness of sucking surface 260A can be sustained at a high level to temperature change.

In the present embodiment, as a method for making sucking surface 260A parallel to the molding surface of convex part 14 in master 10A, the following method is used.

First, the front and back surfaces of master 10A are made parallel to each other in high accuracy level. With this, in master 10A, the molding surface of convex part 14 becomes parallel to the back surface thereof.

Each of reference members 260C and 260D is extendedly provided to support surface 260B supporting above master 10A from the back surface (being an opposite surface to convex part 14) and sucking surface 260A, respectively. The shapes of these reference members 260C and 260D are made so that when master 10A makes close contact with sub-master 20 in a state that support surface 260B and sucking surface 260A are parallel to each other, reference member 260C makes close contact with reference member 260D without backlash.

With this, by making reference members 260C and 260D in close contact with each other, support surface 260B of master 10A, and therefore the molding surface of convex part 14 of master 10, becomes parallel to sucking surface 260A.

In a method such as described above, the reference member may be arranged at least one of support surface 260B and sucking surface 260A. For example, in the case where the reference member is arranged only at support surface 260B, the shape of this reference member may be made so that, when master 10A makes close contact with sub-master 20 in a state that support surface 260B and sucking surface 260A are parallel to each other, the reference member makes close contact with sucking surface 260A without backlash. Similarly, in the case where the reference member is arranged only at sucking surface 260A, the shape of this reference member may be made so that, when master 10A makes close contact with sub-master 20 in a state that support surface 260B and sucking surface 260A are parallel to each other, the reference member makes close contact with support surface 260B without backlash. The degree of flatness performed by such a mechanical contact can be realized in reproducibility of about several arcseconds without having a special alignment apparatus.

Figure 7C:
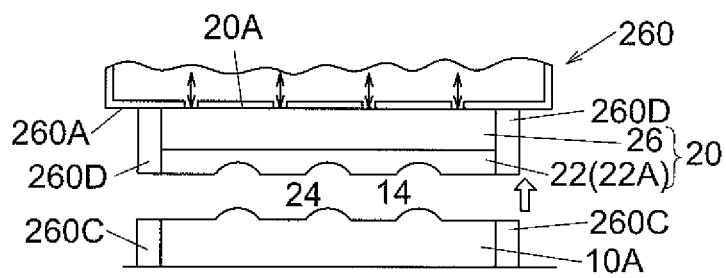

As shown in FIG. 7C, sub-master molding part 22 and sub-master board 26 are demolded to form sub-master 20.

It is desirable that if resin such as PDMS (polydimethylsiloxane) is used as resin 22A, since demolding properties of resin 22A from master 10 are excellent, a large force is not required for separation from master 10, and thereby the molding optical surface is not distorted.

Figure 7D:
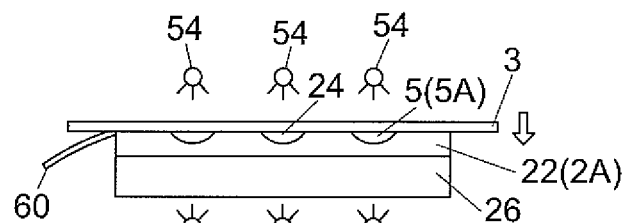

As shown in FIG. 7d, resin 5A is charged between sub-master 20 and glass board 3 and then cured. More specifically, resin 5A is charged into concavo parts 24 of sub-master 20, and then resin 5A is cured while glass board 3 is being pressed from the above.

In the case where resin 5A is charged into concavo parts 24 of sub-master 20, resin 5A may be charged while vacuuming. If resin 5A is charged while vacuuming, resin 5A can be cured without mixing of air bubbles into resin 5A.

In replace of charging resin 5A into concavo parts 24 of sub-master 20, there may be adopted a constitution that resin 5A is applied onto glass board 3, glass board 3 onto which resin 5A was applied is pressed to sub-master 20.

In the case of pressing glass board 3, glass board 3 is preferably provided with a structure to align an axis with sub-master 20. In the case where glass board 3 has a circular shape, for example, D-cut, I-cut, marking, a notch, or the like is preferably formed. Glass board may be a polygonal shape, and in this case, alignment with sub-master 20 is easily performed. Further, when a back surface of glass board 3 is molded, a maker pattern for the degree of coaxial alignment with the molding optical surface in the front surface side may be molded and transferred together with an optical surface at a time of molding the front surface side.

In the case of curing resin 5A, light source 52 arranged under sub-master 20 may be lighted and then light may be irradiated from sub-master 20 side, or light source 54 arranged above glass board 3 may be lighted and the light may be irradiated from glass board 3 side, or both light sources 52 and 54 may be simultaneously lighted and then light is irradiated from both sides of sub-master 20 and glass board 3.

As light sources 52 and 54, there can be used a similar lamp to light source 50 described above, such as a high-pressure mercury lamp, a metal halide lamp, a xenon lamp, a halogen lamp, a fluorescent lamp, a black light, a G-lamp, and an F-lamp, and the light source may be a linear light source or a point light source.

In the case of the light irradiation from light sources 52 and 54, multiple linear or point light sources 52 and 54 are arranged in a lattice pattern so that light may arrive at resin 5A at a time, or linear or point light sources 52 and 54 are scanned in parallel to sub-master 20 and glass board 3 so that light may successively arrive at resin 5A. In this case, the luminance distribution or the illuminance (intensity) distribution is measured, and based on the results of the measurements, the number of irradiation times, the amount of irradiation, irradiation time, or the like are controlled.

When resin 5A is cured, lens part 5 is formed. After that, lens part 5 and glass board 3 are demolded from sub-master 20, and thereby lens array 1 is manufactured (the aforesaid lens array 1 is a lens array in which only lens part 5 was formed on the surface of glass board 3).

In the case of demolding lens array 1 from sub-master 20, tub for pulling 60 is arranged in advance between lens array 1 (glass board 3) and sub-master 20, and lens array 1 may be demolded from sub-master 20 by pulling tub for pulling 60.

In the case where sub-master board 26 of sub-master 20 is an elastic material (resin), lens array 1 may be demolded from sub-master 20 by slightly bending sub-master board 26, and also in the case where glass board 3 is an elastic material (resin) in place of glass, lens array 1 may be demolded from sub-master 20 by slightly bending glass board 3.

If lens array 1 is slightly separated from sub-master 20 to form a gap between the both members, lens array 1 may be demolded from sub-master 20 by pumping air or pure water through the gap.

In the above descriptions, a method for arranging lens part 5 on the one side of glass board 3 was described, but in the case of arranging it on both sides, a master (not illustrated) having multiple molding surfaces having a positive shape corresponding to an optical surface shape of lens part 5 of one surface of glass board 3, and a master having multiple molding surfaces having a positive shape corresponding to an optical surface shape of lens part 5 of the other surface are first prepared, and then, using each of these masters, sub-masters 20C and 20D (refer to FIGS. 7e and 7f) are formed. With this, sub-master 20C has molding surfaces having a negative shape corresponding to an optical surface shape of lens part 5 of one surface of glass board 3, and sub-master 20D has molding surfaces having a negative shape corresponding to an optical surface shape of lens part 5 of the other surface. Then, resin 5A is charged between glass board 3 and each of sub-masters 20C and 20D, after which resin 5A is simultaneously cured to mold lens parts 5 on the both sides of glass board 3. With this process, resin 5A is cured and contracted simultaneously on the both surfaces, and thereby each of the both surfaces becomes lens part 5 without lens 5A being cured and contracted only on one surface of glass board 3. Therefore, unlike in the case of lens parts 5 being successively arranged on each surface, a warp of glass board 3 can be prevented, resulting in improvement of shape accuracy of lens part 5. The sentence "resin 5A on the both surfaces of glass board 3 is simultaneously cured" means that resin 5A is completely cured in an identical curing process, and the curing process is not necessarily started and completed simultaneously. For example, it may be that the viscosity of resin 5A between sub-master 20C and glass board 3 is increased to a prescribed value, after which the above resin 5A and the other resin 5A are completely cured.

For charging resin 5A between glass board 3 and each of sub-masters 20C and 20D, three types of method can be used.

Figure 7E:
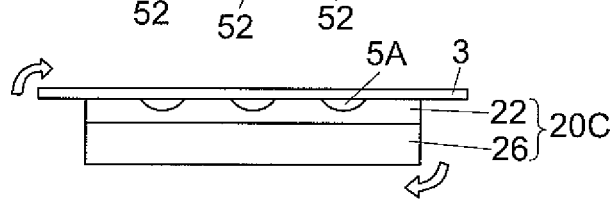
Figure 7F:
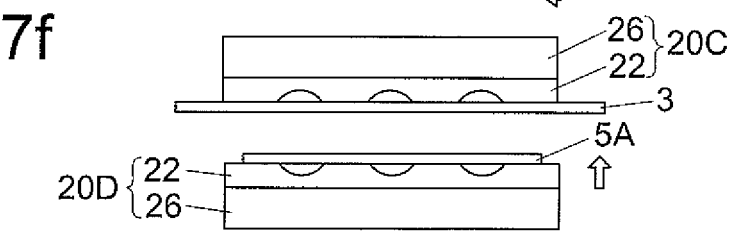

In the first method, as shown in FIGS. 7e and 7f, resin 5A is dropped or discharged on the upper surface of sub-master 20C, after which the aforesaid sub-master 20C is brought into contact with glass board 3 arranged above thereof, and thereby glass board 3 and sub-master 20C are put into a state that resin 5A is charged between them. After that, in a state that glass board 3 and sub-master 20C are made close contact with each other, glass board 3 and sub-master 20C are turned up side down in an integrated fashion, and resin 5A is dropped or discharged on the upper surface of sub-master 20D, after which the aforesaid sub-master 20D is brought into contact with glass board 3 arranged above thereof, and thereby glass board 3 and sub-master 20D are put into a state that resin 5A is charged between them. In the case where glass board 3 and sub-master 20C are sucked and held by a vacuum chuck when glass board 3 and sub-master 20C are turned up side down in an integrated fashion in a state that glass board 3 and sub-master 20C are made close contact with each other, the discharge of resin 5A can be easily realized by an OFF/ON operation of the vacuum chuck.

In the second method, resin 5A is dropped or discharged on the upper surface of glass board 3, after which the aforesaid glass board 3 is brought into contact with sub-master 20C arranged above thereof, and thereby these glass board 3 and sub-master 20C are put into a state that resin 5A is charged between them, and at the same time, resin 5A is dropped or discharged on the upper surface of sub-master 20D, after which the aforesaid sub-master 20D is brought into contact with glass board 3 arranged above thereat and thereby these glass board 3 and sub-master 20D are put into a state that resin 5A is charged between them.

In the third method, the molding and curing operation is successively carried out for each one surface of glass board 3, but, for preventing a warp caused by curing and contraction, demolding of the initial molding surface is not carried out until the molding and curing of the both surfaces are completed. Therefore, while sub-master 20C is in a state of close contact after the charged resin 5A is cured in the initial curing and molding process, molding of the opposite surface is carried out by sub-master 20D. In the molding of sub-master 20C, glass board 3 is under tension toward the molding surface side by curing and contraction of resin 5A, but a warp is prevented by sub-master 20C having the tension while being in a state of close contact. In this state, when charging of resin 5A into the opposite side and molding and curing are carried out by sub-master 20D, the tension is in balance with tension by curing and contraction of this side, and as a result, glass board 3 is not warped even after sub-masters 20C and 20D are demolded.

When bringing glass board 3 into contact with sub-masters 20C and 20D, air bubbles are preferably not left between them. Resin 5A used in this process may be heat curable resin, UV curable resin, or volatile curable resin (such as HSQ). In the case of using UV curable resin, by making at least one of sub-masters 20C and 20D ultraviolet transparent, ultraviolet rays can be irradiated at the same time from one of the aforesaid sub-masters to resin 5A of the both surfaces of glass board 3.

Figure 10:
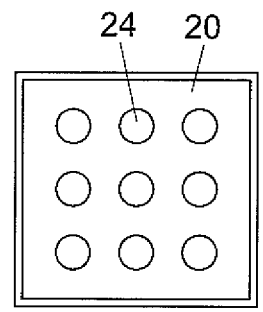
FIG. 10 is a plan showing a schematic constitution of a regular sub-master.

In the case of forming lens part 5 on both front and back surfaces of glass board 3, it may be that integrated large size sub-master 200 like one in which sub-master 20 is, as shown in FIG. 9, extended two times in length and width (the magnification can be changed) and regular sub-master 20 drawn in FIG. 10 are prepared, and, in the case of forming lens part 5 on the surface of glass board 3, sub-master 200 is used, and, in the case of forming lens part 5 on the back surface of the opposite side of glass board 3, sub-master 20 is used multiple times.

Figure 11:
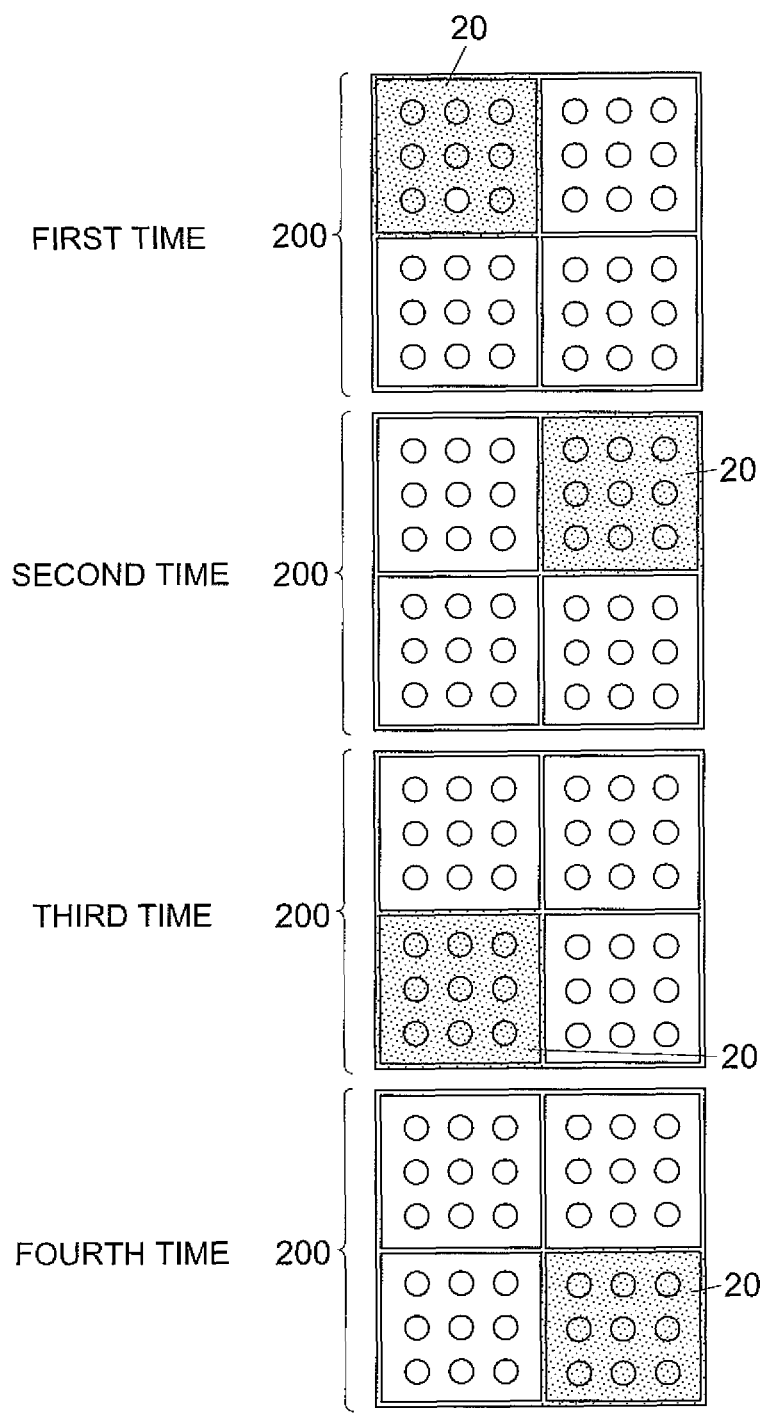
FIG. 11 is a figure schematically describing a state of forming a lens section on both front and back sides of a glass board using the large-size sub-master and the regular sub-master.

Specifically, for the front surface of glass board 3, lens parts 5 are collectively formed using large size sub-master 200. After that, for the back surface of glass board 3, as shown in FIG. 11, lens parts 5 are formed using sub-master 20 four times while shifting sub-master 20 by an ¼ section of large size sub-master 200 each time. With such a constitution, it becomes easy to align the axis of sub-master 20 relative to glass board 3 having lens parts 5 formed by using large size sub-master 200, and thereby it becomes possible to suppress the development of a situation in which, on the front and back sides of glass board 3, lens parts 5 formed by using large size sub-master 200 and lens parts 5 formed by using sub-master 20 are displaced from each other.

Figure 12:
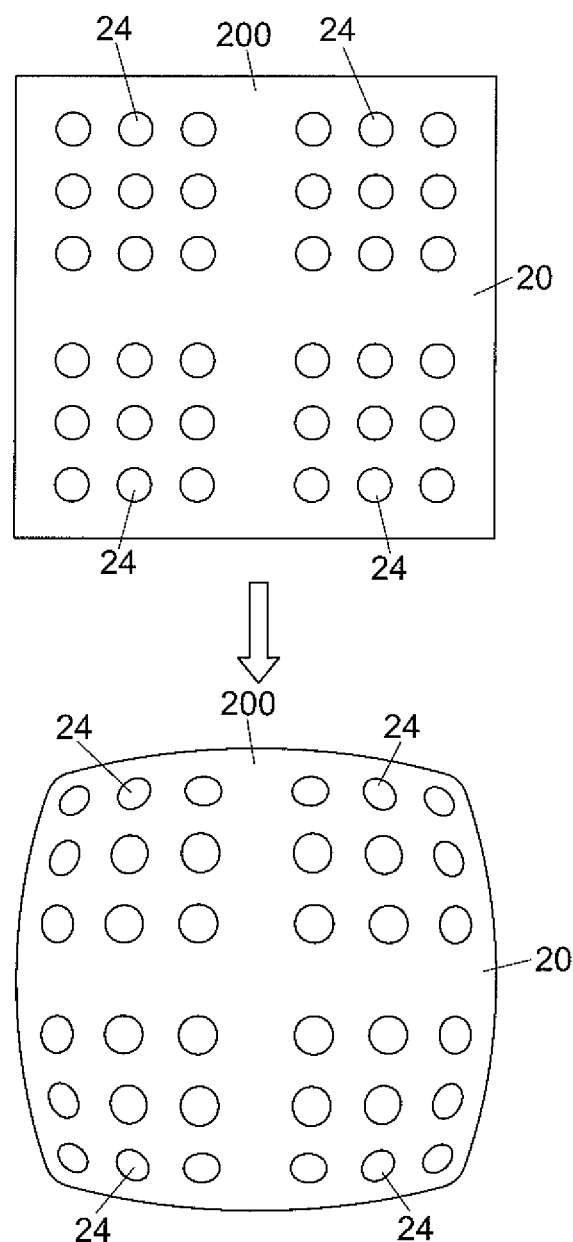
FIG. 12 is a figure to describe a trouble when the large-size sub-master is used.
Figure 13:
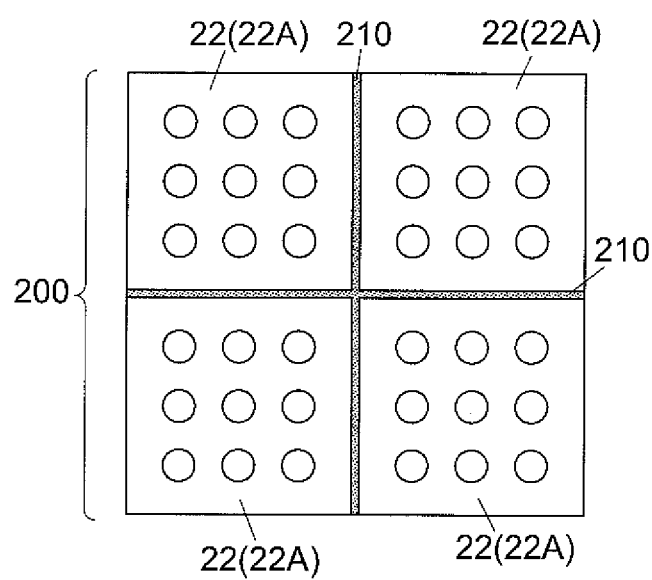
FIG. 13 is a figure showing a deformation example of the large-size sub-master.

However, in the case of using large size sub-master 200, as shown from the upper figure to the lower figure of FIG. 12, a modest warp may be produced with respect to its sub-master molding part 22, and as a result, there may be a case where the original function as a mold cannot be fulfilled. Therefore, it is preferable to adopt a constitution such that an area (stress relaxation area 210), where no resin 22A exists, is arranged in a cross form at the central part of large size sub-master 200 so as to divide large size sub-master 200 as shown in FIG. 13, to suppress generation of warp of sub-master molding part 22 of large size sub-master 200 (to relax stress with glass board 3).

In the case of arranging stress relaxation area 210, for example, when resin 22A is light curable resin, the non-light irradiation area may be formed by masking glass board 3 or sub-master board 26, or by masking light sources 52 and 54.

By using master 10B in place of master 10A and without producing sub-master 20, lens array 1 may be produced directly from master 10B.

In this case, it may be that resin 5A is charged into concavo part 16 of master 10B, and then resin 5A is cured while pressing glass board 3 from the above, after which glass board 3 and lens part 5 is demolded from master 10B. The curing method of resin 5A depends on the resin material, and for example in the case of using UV curable resin, resin 5A is cured by UV irradiation from glass board 3 side, while in the case of using heat curable resin, resin 5A is cured by heating using a heat source such as an infrared lamp, and a heater embedded within master 10B.

The demolding for separating resin 5A from master 10B is important, and as its demolding method, two kinds of methods may be possible.

As the first method, a mold release agent is added into resin 5A. In this case, close adhesion of an anti-reflection coat, being a post process, decreases, or an attachment property with glass board 3 decreases, and then, for the latter case, the attachment property is preferably strengthened by applying coupling agent or the like onto glass board 3.

As the second method, a mold release agent is coated on the surface of master 10B. As the aforesaid mold release agent, used may be triazinthiol or a mold release agent which forms a fluorine or silicon type monomolecular layer. With the aforesaid mold release agent, the coat can be formed in a formed layer thickness of about 10 nm, which has no effect on the optical surface shape. If a coupling agent is applied onto master 10B, or a compound such as $SiO_2$ creating cross-linking between the aforesaid mold release agent and master 10B is coated on master 10B in order to increase close adhesion so that aforesaid mold release agent will not be peeled off during molding, close adhesion is preferably increased.

Next, a method for manufacturing electronic device 100 will be described with reference to FIG. 14.

First, anti-reflection layer 92 is formed on lens array 1 produced in the above manner.

Anti-reflection layer 92 is formed in a following manner. First, lens array 1 (being lens allay 1 without anti-reflection layer 92) is installed in a vacuum evaporation apparatus, and the pressure in the apparatus is reduced to a prescribed value (for example, $2\times10^{-3}$ Pa), and at the same time, lens array 1 is heated by a heater placed above the vacuum evaporation apparatus to a prescribed temperature (for example, 24° C.).

Subsequently, first layer 61 is formed using a vapor deposition source composing first layer 61. In particular, in this case, film-forming temperature Tb is maintained within −40 to +40° C. with respect to a fusion temperature of conductive paste and at higher than or equal to (Ta−60° C.) with respect to reflow process temperature Ta. Further, in the case where resin 5A of lens part 5 has a glass transition temperature, film-forming temperature Tb is maintained at lower than or equal to (glass transition temperature +50° C.).

For example, in the case of forming a ($Ta_2O_5$+5% $TiO_2$) film as first layer 61, the aforesaid vapor deposit source may be evaporated via electron gun heating using OA600 manufactured by OPTRON Co., Ltd. as an evaporation source. A film is preferably formed by introducing $O_2$ gas until an internal pressure of the vacuum evaporation apparatus reaches $1.0\times10^{-2}$ Pa, with the evaporation rate being controlled to a condition of 5 Å/sec during vapor deposition. In the case where the melting temperature of conductive paste to be fused by the reflow process is, for example, 240° C., the film-forming temperature (a temperature in the vapor deposition apparatus) is maintained within a range of 200 to 280° C.

Subsequently, in order to form first layer 61 on the both sides of lens array 1, lens array 1 is reversed by a reversing mechanism in the evaporation apparatus, and then, first layer 61 is also formed on the back surface in the same manner as the above (a film formation on the back surface of second layer 62 is carried out in a similar manner).

After that, second layer 62 is further formed on first layer 61 using a vapor deposition source composing second layer 62. Also in this case, in a similar manner to the formation of first layer 61, film-forming temperature Tb is maintained within a range of 40 to +40° C. with respect to a melting temperature of conductive paste to be fused at a reflow process, and at higher than or equal to (Ta−60° C.) with respect to reflow process temperature Ta. Further, in the case where resin 5A of lens part 5 has a glass transition temperature, film-forming temperature Tb is maintained at lower than or equal to (glass transition temperature +50° C.).

For example, in the case of forming $SiO_2$ film as second layer 62, it is preferable that $O_2$ gas is introduced until an internal pressure of the vacuum evaporation apparatus reaches $1.0\times10^{-2}$ Pa, and the evaporation rate is being controlled to a condition of 5 Å/sec. In the case where the melting temperature of conductive paste to be fused by the reflow process is, for example, 240° C., film-forming temperature Tb (a temperature in the vapor deposition apparatus) is maintained within a range of 200 to 280° C.

With the above steps, anti-reflection layer 92 can be formed on lens array 1.

Figure 14A:
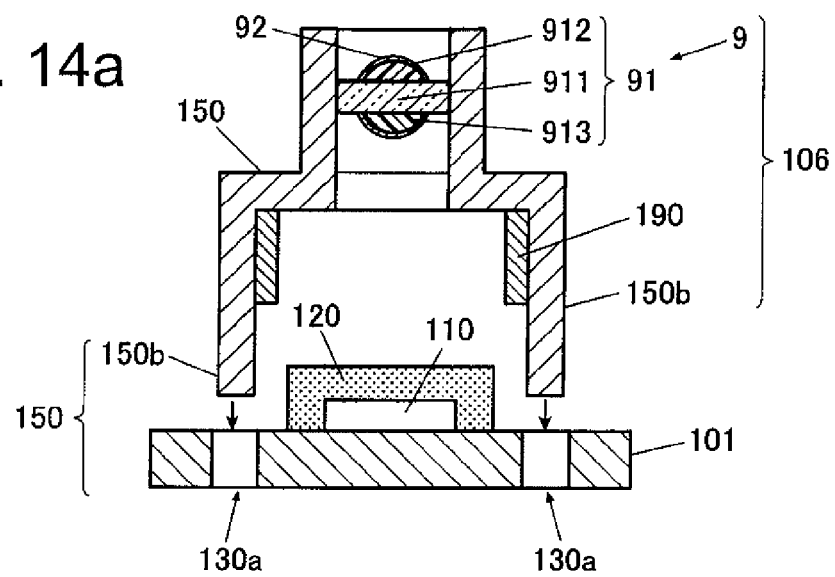
FIG. 14 is a figure schematically describing a method for manufacturing an electronic device in a preferred embodiment of the present invention.

Next, lens array 1 is cut and divided for each of second and third optical members 912 and 913 to produce multiple wafer lenses 91, after which, using these wafer lenses 91, board module 105 and lens module 106 are assembled. Then, as shown in FIG. 14a, fitting part 150b of lens case 150 is inserted into fitting hole 130a of sub-board 130 until a lower end of color member 190, which was in advance installed in lens case 150, is brought into contact with the upper surface of sub-board 130, and then fixed to form imaging module 102.

Figure 14B:
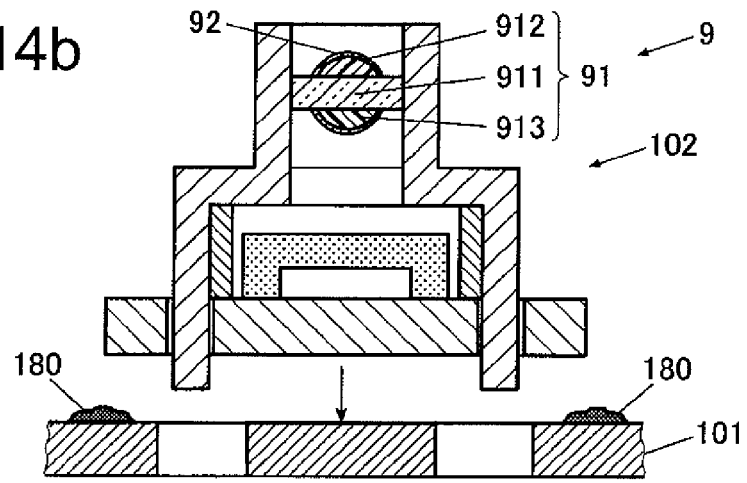
Figure 14C:
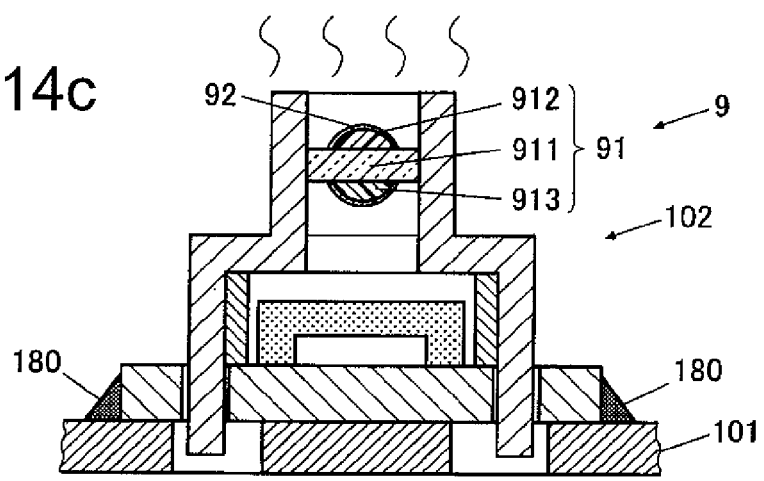

Subsequently, as shown in FIG. 14b, imaging module 102 and other electronic parts are placed at prescribed mounting positions of circuit board 101 on which electrically-conductive material 180 such as a solder was in advance applied (potting). After that, as shown in FIG. 14c, circuit board 101, on which imaging module 102 and other electronic parts are placed, is transferred to a reflow furnace (not illustrated) by a belt conveyor or the like, and then, the aforesaid circuit board 101 is heated at temperature Ta, for example about 230 to about 270° C. for about 5 to about 10 minutes (a reflow process). As a result of the reflow process, electrically-conductive material 180 is fused and imaging module 102 is mounted on circuit board 101 together with other electronic parts, which are then incorporated into cover case 103 to manufacture electronic device 100.

According to the above present embodiment, in the case where imaging lens 9, in which anti-reflection layer 92 composed of an inorganic material is formed on wafer lens 91 composed of curable resin, is subjected to a reflow process, only wafer lens 91 is expanded, since a coefficient of linear expansion of anti-reflection layer 92 is small, while a coefficient of linear expansion of wafer lens 91 is large. As a result, cracks may be generated in anti-reflection layer 92, but if anti-reflection layer 92 is formed at film-forming temperature Tb of higher than or equal to (reflow process temperature Ta−60° C.), generation of such cracks can be prevented (refer to an embodiment described below).

Further, since the resin material of the optical surface of wafer lens 91 has no glass transition temperature or has a glass transition temperature of higher than or equal to (film-forming temperature of anti-reflection layer 92 Tb−50° C.), it is possible to remarkably suppress generation of wrinkles on anti-reflection layer 92 by forming anti-reflection layer 92 composed of an inorganic material at film-forming temperature Tb on the above optical surface of wafer lens 91 (refer to an embodiment described below).

In addition, by using resin 5A, which contains curable resin, for lens part 5, lens part 5 is provided with a heat-resisting property with which lens part 5 becomes resistible to the reflow process. Even with a resin material which is slightly softened at around glass transition temperature due to containing curable resin, by using the resin material such as described above (namely, having a glass transition temperature of not less than 290° C. or having a glass transition temperature of higher than or equal to (film-forming temperature of anti-reflection layer 92 Tb−50° C.)), and by forming anti-reflection layer 92 composed of an inorganic material at film-forming temperature Tb on the above lens part 5, film separation or generation of wrinkles at anti-reflection layer 92 can also be remarkably suppressed.

Therefore, by using imaging lens 9 having such wafer lens 91 for the reflow process, electronic device 100 can be manufactured at a low cost.

Second Embodiment

The second embodiment is almost the same as the first embodiment except mainly for the following points.

In producing lens array 1, as a molding mold, used are master 10, sub-master 30, and sub-sub-master 40 of FIG. 5. While, in the first embodiment, sub-master 20 was used for producing lens array 1 from master 10 (10A), the second embodiment differs from the first embodiment in a point that two molds, sub-master 30 and sub-sub-master 40, are mainly used for producing lens array 1 from master 10 (10A). In particular, the step of producing sub-master 30 from master 10B and the step of producing lens array 1 from sub-sub-master 40 are almost the same as those of the first embodiment, but the step of producing sub-sub-master 40 from sub-master 30 differs from that of the first embodiment.

As shown in FIG. 5a, master 10B is a mold in which multiple concavo parts 16 are formed in an array shape on base part 12 having a rectangular parallelepiped shape. The shape of concavo part 16 is designed to be a negative shape corresponding to lens part 5 of lens array 1, and is indented in substantially hemispherical shape in this figure. The outer shape of master 10B may not be a quadrilateral and may be a circular, but after this, description will be made with a quadrilateral as an example.

Optical surfaces of master 10B may be created with a high degree of accuracy by cutting a material such as a nickel-phosphor or aluminum alloy, and free-cutting brass via diamond cutting, or may be created by performing cutting work on a high hardness material such as carbide. The optical surface created by master 10B is preferably one in which multiple concavo parts 16 are arranged in an array shape as shown in FIG. 5a, or may be one in which only a single concavo part 16 is arranged.

Figure 5B:
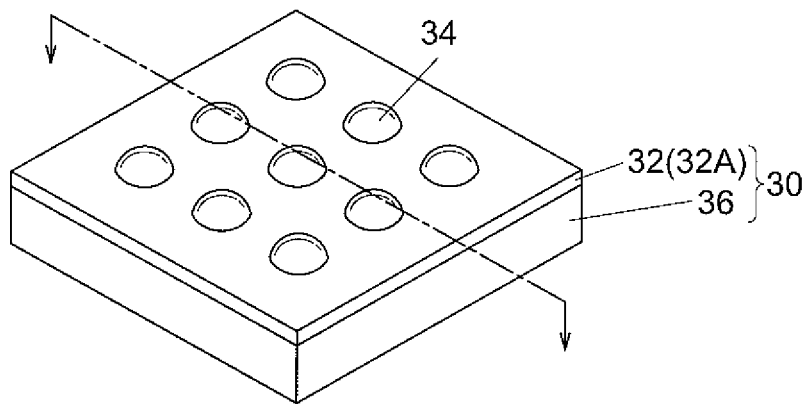

As shown in FIG. 5b, sub-master 30 is composed of sub-master molding part 32 and sub-master board 36. On sub-master molding part 32, multiple convex parts 34 are formed in an array shape. The shape of convex part 34 is designed to be a positive shape corresponding to lens part 5 of lens array 1, and is projected in substantially hemispherical shape in this figure. Sub-master molding part 32 is formed by resin 32A.

For resin 32A, basically a similar material to resin 22A used for sub-master 20 of the first embodiment may be used, and, in particular, preferably used is resin having a demolding property and a heat-resisting property, and having a small coefficient of linear expansion (namely, resin having small surface energy). Specifically, any of above-described light curable resin, heat curable resin, or thermoplastic resin may be used, and the resin may be transparent or nontransparent, but if, for example, thermoplastic resin is used, above-described fluorine type resin is necessarily used. This is because if silicone type thermoplastic resin is used, since it has a large coefficient of linear expansion, it will be transformed when it is thermally transferred, and thereby a fine structure cannot be correctly transferred.

For sub-master board 36, a similar material to that for sub-master board 26 can be used.

Figure 5C:
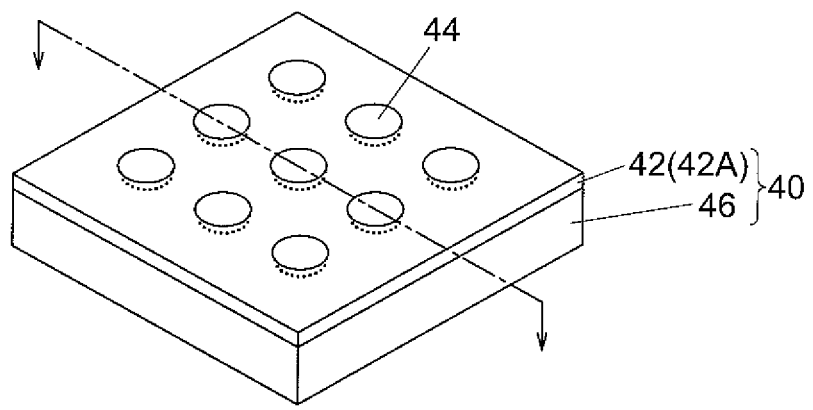

As shown in FIG. 5c, sub-sub-master 40 is composed of sub-sub-master molding part 42 and sub-sub-master board 46. On sub-sub-master molding part 42, multiple concavo parts 44 are formed in an array shape. Concavo part 44 is a part corresponding to lens part 5 of lens array 1, and is indented in substantially hemispherical shape. This sub-sub-master molding part 42 is formed with resin 42A.

The similar material used for resin 22A of sub-master 20 of the first embodiment can also be used for resin 42A, but silicone type resin or olefin type resin is preferably used in terms that it can be bent and is easily demolded.

The similar material used for sub-master board 26 can also be used for sub-sub-master board 46.

Next, a method for producing lens array 1 will be simply described with reference to FIGS. 15 and 16.

Figure 15A:
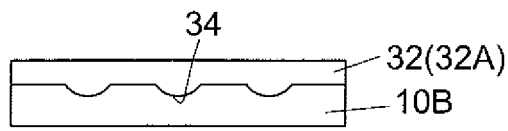
FIG. 15 is a figure describing a method for producing a lens array.

As shown in FIG. 15a, resin 32A is applied to master 10B, after which resin 32A is cured, and then concave parts 16 of master 10B are transferred to resin 32A to form multiple convex parts 34 on resin 32A. With these processes, sub-master molding part 32 is formed.

Figure 15B:
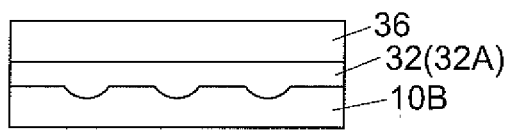

As shown in FIG. 15b, sub-master board 36 is adhered to sub-master molding part 32.

Figure 15C:
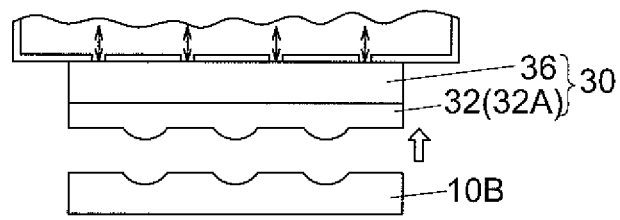

After that, as shown in FIG. 15c, sub-master molding part 32 and sub-master board 36 are demolded from master 10B to manufacture sub-master 30.

Figure 15D:
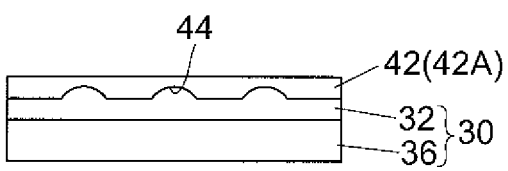

Subsequently, as shown in FIG. 15d, resin 42A is applied to sub-master 30, after which resin 42A is cured, and then convex parts 34 of sub-master 30 are transferred to resin 42A to form multiple concavo parts 44 on resin 42A. With these processes, sub-sub-master molding part 42 is formed.

Figure 15E:
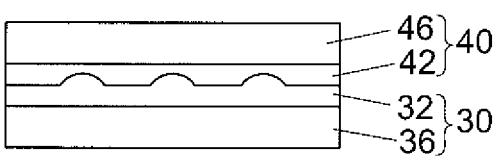

Then, as shown in FIG. 15e, sub-sub-master board 46 is mounted on sub-sub-master molding part 42.

Figure 16F:
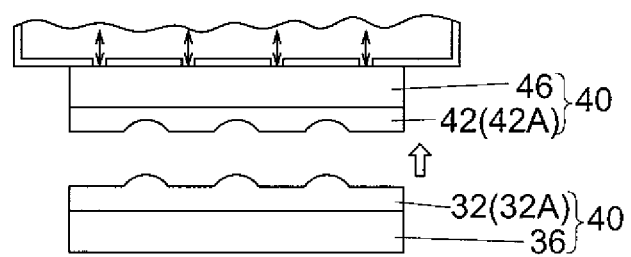
FIG. 16 is a figure describing a method for producing the succeeding steps of FIG. 15.

As shown in FIG. 16f, sub-sub-master molding part 42 and sub-sub-master board 46 are demolded from sub-master 30 to manufacture sub-sub-master 40.

Figure 16G:
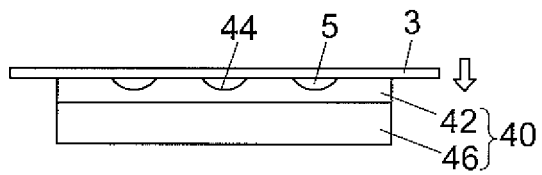
Figure 17:
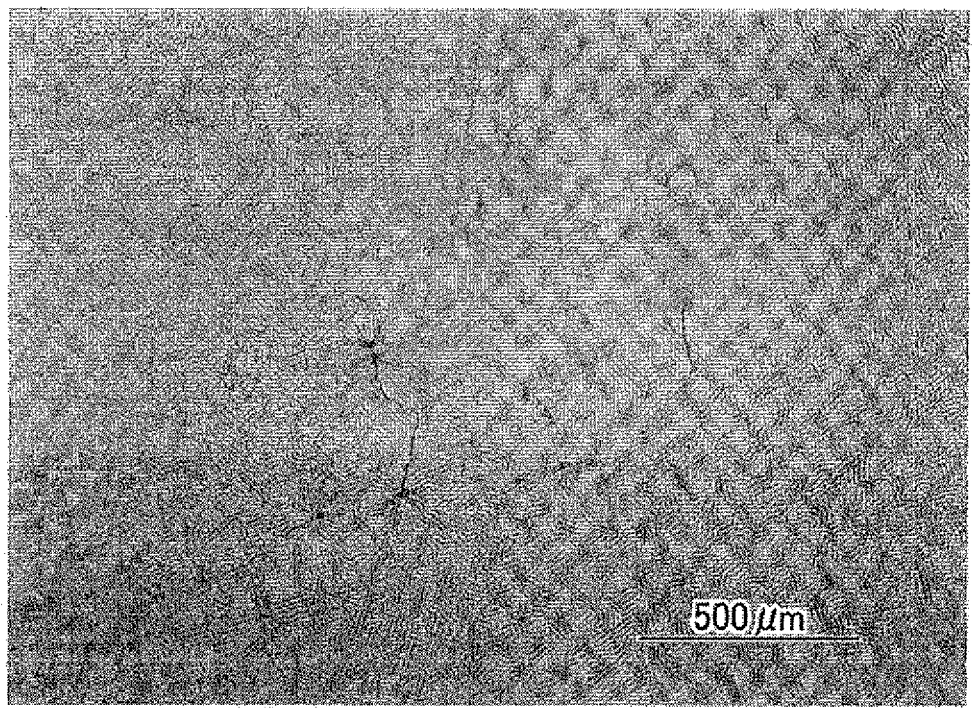
FIG. 17 is a figure showing wrinkles on the lens surface.
Figure 18:
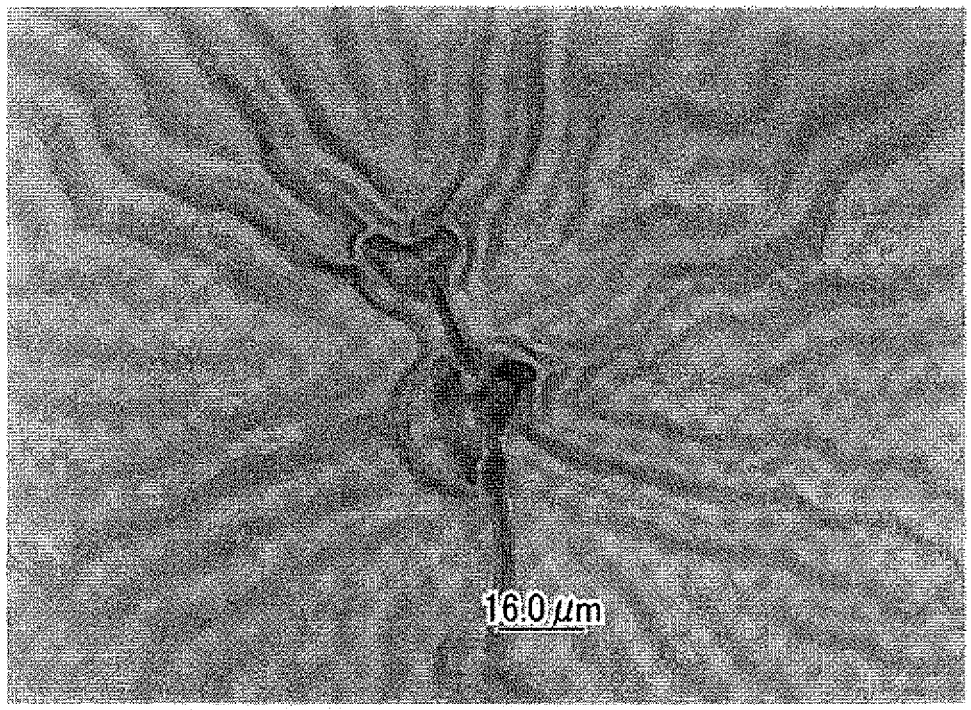
FIG. 18 is a figure showing wrinkles on the lens surface.

As shown in FIG. 16g, resin 5A is charged into concavo part 44 of sub-sub-master 40, and then resin 5A is cured while pressing glass board 3 from the above. As a result, lens part 5 is formed from resin 5A. After that, lens part 5 and glass board 3 are demolded from sub-sub-master 40 to manufacture lens array 1 (aforesaid lens array 1 is an array in which lens parts 5 are formed only on the front surface of glass board 3).

In the case of forming lens part 5 on both front and back surfaces of glass board 3 by forming lens part 5 also on the back surface of glass board 3, a master (not illustrated) having multiple molding surfaces of a negative shape corresponding to an optical surface shape of lens 5 of one surface of glass board 3, and a master having multiple molding surfaces of a negative shape corresponding to an optical surface shape of lens 5 of the other surface are prepared, and then, using each of these masters, a sub-master having a molding surface of positive shape is formed, and further, using each of these sub-masters, a sub-sub-master is formed. After that, resin 5A is charged between each of sub-sub-masters and glass board 3, after which resin 5A is cured to form lens part 5 on the both surfaces of glass board 3.

In the above embodiment, it was described that imaging lens 9 was adopted as the optical element relating to the present invention, but other optical element of other type or other use may be adopted. Further, it was described that anti-reflection layer 92 was arranged on the surface of wafer lens 91, but other types of coat such as antistatic layer may be arranged.

EXAMPLES

Hereinafter, the optical element relating to the present invention will be more specifically described by citing examples and comparative examples. However, the present invention is not limited to examples.

[Preparation of Samples]

As examples and comparative examples of the present invention, samples (1) to (96) as shown in the following Tables 1 to 4 were prepared.

TABLE 1

| No. | Type of Resin | Tg | Coat Temperature Tb | Coat Wrinkles | Reflow Temperature Ta | Coat Crack | Note |
|---|---|---|---|---|---|---|---|
| 1 | Epoxy A | 87 | 100 | A | 260 | C | Comp. |
| 2 | Epoxy A | 87 | 150 | B | 260 | C | Comp. |
| 3 | Epoxy A | 87 | 170 | B | 260 | C | Comp. |
| 4 | Epoxy A | 87 | 180 | B | 260 | B | Comp, |
| 5 | Epoxy A | 87 | 200 | B | 260 | A | Comp. |
| 6 | Epoxy A | 87 | 220 | B | 260 | A | Comp. |
| 7 | Epoxy B | 123 | 100 | A | 260 | C | Comp. |
| 8 | Epoxy B | 123 | 150 | A | 260 | C | Comp. |
| 9 | Epoxy B | 123 | 170 | A | 260 | C | Comp. |
| 10 | Epoxy B | 123 | 180 | B | 260 | B | Comp. |
| 11 | Epoxy B | 123 | 200 | B | 260 | A | Comp. |
| 12 | Epoxy B | 123 | 220 | B | 260 | A | Comp. |
| 13 | Epoxy C | 156 | 100 | A | 260 | C | Comp. |
| 14 | Epoxy C | 156 | 150 | A | 260 | C | Comp. |
| 15 | Epoxy C | 156 | 170 | A | 260 | C | Comp. |
| 16 | Epoxy C | 156 | 180 | A | 260 | B | Comp. |
| 17 | Epoxy C | 156 | 200 | A | 260 | A | Inv. |
| 18 | Epoxy C | 156 | 220 | B | 260 | A | Comp. |
| 19 | Acryl | None | 100 | A | 260 | C | Comp. |
| 20 | Acryl | None | 150 | A | 260 | C | Comp. |
| 21 | Acryl | None | 170 | A | 260 | C | Comp. |
| 22 | Acryl | None | 180 | A | 260 | B | Comp. |
| 23 | Acryl | None | 200 | A | 260 | A | Inv. |
| 24 | Acryl | None | 220 | A | 260 | A | Inv. |

Comp.: Comparison, Inv.: Present Invention

TABLE 2

| No. | Type of Resin | Tg | Coat Temperature Tb | Coat Wrinkles | Reflow Temperature Ta | Coat Crack | Note |
|---|---|---|---|---|---|---|---|
| 25 | Epoxy A | 87 | 100 | A | 240 | C | Comp. |
| 26 | Epoxy A | 87 | 150 | B | 240 | C | Comp, |
| 27 | Epoxy A | 87 | 170 | B | 240 | B | Comp. |
| 28 | Epoxy A | 87 | 180 | B | 240 | A | Comp. |
| 29 | Epoxy A | 87 | 200 | B | 240 | A | Comp. |
| 30 | Epoxy A | 87 | 220 | B | 240 | A | Comp. |
| 31 | Epoxy B | 123 | 100 | A | 240 | C | Comp. |
| 32 | Epoxy B | 123 | 150 | A | 240 | C | Comp. |
| 33 | Epoxy B | 123 | 170 | A | 240 | B | Comp. |
| 34 | Epoxy B | 123 | 180 | B | 240 | A | Comp. |
| 35 | Epoxy B | 123 | 200 | B | 240 | A | Comp. |
| 36 | Epoxy B | 123 | 220 | B | 240 | A | Comp. |
| 37 | Epoxy C | 156 | 100 | A | 240 | C | Comp. |
| 38 | Epoxy C | 156 | 150 | A | 240 | C | Comp. |
| 39 | Epoxy C | 156 | 170 | A | 240 | B | Comp. |
| 40 | Epoxy C | 156 | 180 | A | 240 | A | Inv. |
| 41 | Epoxy C | 156 | 200 | A | 240 | A | Inv. |
| 42 | Epoxy C | 156 | 220 | B | 240 | A | Comp. |
| 43 | Acryl | None | 100 | A | 240 | C | Comp. |
| 44 | Acryl | None | 150 | A | 240 | C | Comp. |
| 45 | Acryl | None | 170 | A | 240 | B | Comp. |
| 46 | Acryl | None | 180 | A | 240 | A | Inv. |
| 47 | Acryl | None | 200 | A | 240 | A | Inv. |
| 48 | Acryl | None | 220 | A | 240 | A | Inv. |

Comp.: Comparison, Inv.: Present Invention

TABLE 3

| No. | Type of Resin | Tg | Coat Temperature Tb | Coat Wrinkles | Reflow Temperature Ta | Coat Crack | Note |
|---|---|---|---|---|---|---|---|
| 49 | Epoxy A | 87 | 100 | A | 220 | C | Comp. |
| 50 | Epoxy A | 87 | 150 | B | 220 | C | Comp. |
| 51 | Epoxy A | 87 | 170 | B | 220 | A | Comp, |
| 52 | Epoxy A | 87 | 180 | B | 220 | A | Comp. |
| 53 | Epoxy A | 87 | 200 | B | 220 | A | Comp. |
| 54 | Epoxy A | 87 | 220 | B | 220 | A | Comp. |
| 55 | Epoxy B | 123 | 100 | A | 220 | C | Comp. |
| 56 | Epoxy B | 123 | 150 | A | 220 | C | Comp. |
| 57 | Epoxy B | 123 | 170 | A | 220 | A | Inv. |
| 58 | Epoxy B | 123 | 180 | B | 220 | A | Comp. |
| 59 | Epoxy B | 123 | 200 | B | 220 | A | Comp. |
| 60 | Epoxy B | 123 | 220 | B | 220 | A | Comp. |
| 61 | Epoxy C | 156 | 100 | A | 220 | C | Comp. |
| 62 | Epoxy C | 156 | 150 | A | 220 | C | Comp. |
| 63 | Epoxy C | 156 | 170 | A | 220 | A | Inv. |
| 64 | Epoxy C | 156 | 180 | A | 220 | A | Inv. |
| 65 | Epoxy C | 156 | 200 | A | 220 | A | Inv. |
| 66 | Epoxy C | 156 | 220 | B | 220 | A | Comp. |
| 67 | Acryl | None | 100 | A | 220 | C | Comp. |
| 68 | Acryl | None | 150 | A | 220 | C | Comp. |
| 69 | Acryl | None | 170 | A | 220 | A | Inv, |
| 70 | Acryl | None | 180 | A | 220 | A | Inv. |
| 71 | Acryl | None | 200 | A | 220 | A | Inv. |
| 72 | Acryl | None | 220 | A | 220 | A | Inv. |

Comp.: Comparison, Inv.: Present Invention

TABLE 4

| No. | Type of Resin | Tg | Coat Temperature Tb | Coat Wrinkles | Reflow Temperature Ta | Coat Crack | Note |
|---|---|---|---|---|---|---|---|
| 73 | Epoxy A | 87 | 100 | A | 200 | C | Comp. |
| 74 | Epoxy A | 87 | 150 | B | 200 | A | Comp. |
| 75 | Epoxy A | 87 | 170 | B | 200 | A | Comp. |
| 76 | Epoxy A | 87 | 180 | B | 200 | A | Comp. |
| 77 | Epoxy A | 87 | 200 | B | 200 | A | Comp, |
| 78 | Epoxy A | 87 | 220 | B | 200 | A | Comp. |
| 79 | Epoxy B | 123 | 100 | A | 200 | C | Comp. |
| 80 | Epoxy B | 123 | 150 | A | 200 | A | Inv. |
| 81 | Epoxy B | 123 | 170 | A | 200 | A | Inv. |
| 82 | Epoxy B | 123 | 180 | B | 200 | A | Comp. |
| 83 | Epoxy B | 123 | 200 | B | 200 | A | Comp. |
| 84 | Epoxy B | 123 | 220 | B | 200 | A | Comp. |
| 85 | Epoxy C | 156 | 100 | A | 200 | C | Comp. |
| 86 | Epoxy C | 156 | 150 | A | 200 | A | Inv. |
| 87 | Epoxy C | 156 | 170 | A | 200 | A | Inv. |
| 88 | Epoxy C | 156 | 180 | A | 200 | A | Inv. |
| 89 | Epoxy C | 156 | 200 | A | 200 | A | Inv. |
| 90 | Epoxy C | 156 | 220 | B | 200 | A | Comp. |
| 91 | Acryl | None | 100 | A | 200 | C | Comp. |
| 92 | Acryl | None | 150 | A | 200 | A | Inv. |
| 93 | Acryl | None | 170 | A | 200 | A | Inv. |
| 94 | Acryl | None | 180 | A | 200 | A | Inv. |
| 95 | Acryl | None | 200 | A | 200 | A | Inv. |
| 96 | Acryl | None | 220 | A | 200 | A | Inv. |

Comp.: Comparison, Inv.: Present Invention

Specifically, as resin of lens part 5, various UV curable resins having heat-resisting property were selected (refer to a column "Type of Resin" in Tables).

In Tables, "Epoxy Resin A", "Epoxy Resin B", or "Epoxy Resin C" indicates resin in which UVI-6992, as a UV curable initiator, was added by 4 weight % into hydrogenated bisphenol A epoxy resin. Each of Epoxy Resins A, B and C was made to have different Tg by using resin having different epoxy equivalents for each resin. Specifically, the lower the epoxy equivalent, the higher the crosslink density, and as a result it is possible to increase Tg.

As the acryl resin, adamantyl methacrylate type resin was used.

The glass transition temperatures Tg of these resins were determined using TMA/SS instrument, manufactured by Seiko Instruments Inc., with a rate of temperature rise of 5° C./min from 30 to 290° C., and a load of 50 mN, to obtain values given in a column of "Tg" in Tables.

In Tables, "Coat Temperature Tb" means a film-forming temperature of anti-reflection layer Tb. This anti-reflection layer was formed on the front surface of lens part 5 of lens array 1 via a vacuum deposition method. Specifically, first, lens array 1 was mounted in a vacuum deposition apparatus, and the pressure in the apparatus was reduced to $2\times10^{-3}$ Pa, and at the same time, lens array 1 was heated up to 240° C. by a heater placed above the vacuum deposition apparatus. Subsequently, in order to form a layer of ($Ta_2O_5$+5% $TiO_2$) of 20 nm thickness on lens array 1, a layer of ($Ta_2O_5$+5% $TiO_2$) was formed on lens array 1 using OA600, as a row material of the layer, manufactured by OPTRON Co., Ltd., by evaporating thereof via electron gun heating. During the vapor deposition, $O_2$ gas was introduced until an internal pressure of the vacuum deposition apparatus reaches $1.0\times10^{-2}$ Pa, and the vapor deposition was carried out with the evaporation rate being controlled to a condition of 5 Å/sec. Subsequently, $O_2$ gas was introduced until an internal pressure of the vacuum deposition apparatus reaches $1.2\times10^{-2}$ Pa, vapor deposition of $SiO_2$ layer of 110 nm in thickness was carried out with the evaporation rate being controlled to a condition of 5 Å/sec.

[Evaluation of Samples] (Evaluation of Wrinkles of Anti-Reflection Layer)

Each of samples (1) to (96) was vacuumed (reduced pressure) in the vacuum deposition apparatus as described above, and an anti-reflection film was formed thereon at "Coat Temperature Tb" given in above Tables, after which each sample was cooled down to the room temperature. On these samples (which were not subjected to a reflow process), the surface conditions were observed by an optical microscope, and whether wrinkles were present or not was evaluated based on the following criteria to obtain results given in a column "Coat Wrinkle" in above Tables.

A: No wrinkles are observed.
B: Wrinkles are observed.

In any cases where the temperature was raised to coat temperature Tb in the vacuum deposition apparatus without the anti-reflection layer, no wrinkles were observed.

(Evaluation of Crack after Reflow Process)

Each of samples (1) to (96) was left under the reflow conditions of temperature given in the column "Reflow Temperature" of above Tables and for 5 minutes, and after the samples were let stand, roughness (cracks) on the surfaces were evaluated based on the following criteria to obtain results given in the column "Coat Crack" in above Tables.

A: No crack is observed.
B: One to 10 cracks are observed.
C: At least 11 cracks are observed.

(Comprehensive Evaluation)

From the above results, it was found that, in samples (17), (23), (24), (40), (41), (46) to (48), (57), (63) to (65), (69) to (72), (80), (81), (86) to (89), and (92) to (96) of the present invention, generation of wrinkles and crack were remarkably suppressed, compared to other Comparative Samples.

DESCRIPTION OF NUMERIC DESIGNATIONS

9: an imaging lens (an optical element)
91: a wafer lens (a board)
92: an anti-reflection layer
911: a first optical element
912: a second optical element

What is claimed is:

1. A method for producing an optical element comprising a base material in which at least one optical surface is formed of a resin material, and a coat comprising an inorganic material formed on the optical surface of the base material, and which is mounted on a board together with an electronic component by a reflow process at temperature Ta, wherein
    the coat is formed at film-forming temperature Tb of not less than (Ta-60° C.), and
    the resin material is a material having a glass transition temperature of not less than 290° C. or having a glass transition temperature of not less than (Tb−50° C.).

2. The method for producing the optical element of claim 1, wherein the resin material is a material containing a curable resin.

3. The method for producing the optical element of claim 1 wherein the base material is a wafer lens comprising
    a first optical member composed of a material containing glass or the curable resin, and
    a second optical member composed of the resin material and joined to the first optical.

4. An optical element produced by the method for producing the optical element of claim 1.

\* \* \* \* \*